(12) United States Patent
Huang et al.

(10) Patent No.: US 12,519,768 B2
(45) Date of Patent: Jan. 6, 2026

(54) ACCOUNT BINDING METHOD, DEVICE, AND SYSTEM

(71) Applicant: HUAWEI TECHNOLOGIES CO., LTD., Guangdong (CN)

(72) Inventors: Yigui Huang, Nanjing (CN); Yun Ye, Nanjing (CN); Denglong Qiao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 841 days.

(21) Appl. No.: 17/768,561

(22) PCT Filed: Sep. 29, 2020

(86) PCT No.: PCT/CN2020/119018
§ 371 (c)(1),
(2) Date: Jan. 10, 2023

(87) PCT Pub. No.: WO2021/073428
PCT Pub. Date: Apr. 22, 2021

(65) Prior Publication Data
US 2023/0122238 A1 Apr. 20, 2023

(30) Foreign Application Priority Data
Oct. 14, 2019 (CN) .......................... 201910974891.3

(51) Int. Cl.
*H04L 9/40* (2022.01)
*H04L 67/02* (2022.01)
(Continued)

(52) U.S. Cl.
CPC ......... *H04L 63/0815* (2013.01); *H04W 12/06* (2013.01); *H04W 12/084* (2021.01); *H04W 12/35* (2021.01); *H04L 67/02* (2013.01)

(58) Field of Classification Search
CPC ..... H04L 41/22; H04L 63/105; H04L 63/102; H04L 63/20
See application file for complete search history.

(56) References Cited

U.S. PATENT DOCUMENTS

2016/0321745 A1 11/2016 Zhang et al.

FOREIGN PATENT DOCUMENTS

| CN | 104243433 A | 12/2014 |
| CN | 105262819 A | 1/2016 |

(Continued)

OTHER PUBLICATIONS

Office Action issued in CN201910974891.3, dated Sep. 29, 2021, 6 pages.

(Continued)

*Primary Examiner* — Alexander Lagor
*Assistant Examiner* — Shu Chun Gao

(57) ABSTRACT

The technology of this application relates to an account binding method, a device, and a system, and relates to the field of electronic technologies. An electronic device logs in to a user account of a first application. After detecting a first preset operation of a user, the electronic device obtains, by using the first application, an OpenID corresponding to the user account of the first application, where the first preset operation is used to indicate to associate a second application with the first application. The electronic device sends the OpenID of identity information of the second application to a server of the first application, and obtains account binding success information from the server of the first application.

20 Claims, 37 Drawing Sheets

(51) Int. Cl.
  *H04W 12/06* (2021.01)
  *H04W 12/084* (2021.01)
  *H04W 12/30* (2021.01)

(56) References Cited

FOREIGN PATENT DOCUMENTS

| CN | 105306733 | A |   | 2/2016  |          |           |
|----|-----------|---|---|---------|----------|-----------|
| CN | 105897668 | A |   | 8/2016  |          |           |
| CN | 106686025 | A | * | 5/2017  |          |           |
| CN | 107302625 | A | * | 10/2017 | ............. | G06Q 10/10 |
| CN | 108337227 | A |   | 7/2018  |          |           |
| CN | 108768803 | A |   | 11/2018 |          |           |
| CN | 109426870 | A | * | 3/2019  | ............. | G06Q 10/02 |
| CN | 109525604 | A |   | 3/2019  |          |           |
| CN | 110225035 | A |   | 9/2019  |          |           |
| WO | 2014176749 | A1 |   | 11/2014 |          |           |
| WO | 2018113130 | A1 |   | 6/2018  |          |           |
| WO | WO-2019149218 | A1 | * | 8/2019 | ........... | G06F 16/168 |

OTHER PUBLICATIONS

European Search Report for EP Application No. 20877057.8 dated Oct. 18, 2022, 11 pages.

* cited by examiner

ACCOUNT BINDING METHOD, DEVICE, AND SYSTEM

CROSS REFERENCE TO RELATED APPLICATION(S)

This application is a National Stage of International Application No. PCT/CN2020/119018, filed Sep. 29, 2020, which claims priority to Chinese Patent Application No. 201910974891.3, filed Oct. 14, 2019, both of which are hereby incorporated by reference in their entireties.

TECHNICAL FIELD

Embodiments of this application relate to the field of electronic technologies, and in particular, to an account binding method, a device, and a system.

BACKGROUND

On electronic devices such as a mobile phone, a tablet, or an in-vehicle central control, a HiBoard may cooperate with a third-party application to display, to a user, an event recommended by the third-party application. Generally, after a binding relationship is established between a user account of the third-party application and a user account of the HiBoard, the HiBoard may display a user-associated event recommended by the third-party application.

In a conventional technology, a third-party application side needs to do the following complex development work: developing a third-party quick application, developing a login page that is based on the third-party quick application, and invoking, in the third-party quick application, an account management software development kit (SDK) of the HiBoard is invoked, to obtain an authorization code corresponding to the user account of the HiBoard to further obtain a unique open identity (open identity document, OpenID) of a user, so as to bind the user account of the third-party application to the user account of the HiBoard by using the OpenID.

In the existing account binding solution, a developer of the third-party application may not be familiar with a development procedure of a quick application, and consequently development work is relatively difficult. Moreover, development workload on the third-party application side is large, a binding procedure is complex, and binding costs are high, which is not helpful in introducing the third-party application into the HiBoard.

SUMMARY

Embodiments of this application provide an account binding method, a device, and a system. A HiBoard can replace a third-party quick application to obtain an OpenID corresponding to a user account of the HiBoard, to bind a user account of a third-party application to the user account of the HiBoard by using the OpenID, thereby reducing development workload of the third-party application, simplifying a procedure for binding the accounts of the third-party application and the HiBoard, and improving efficiency and flexibility of account binding.

To achieve the foregoing objective, the following technical solutions are used in embodiments of this application.

According to an aspect, an embodiment of this application provides an account binding method, and the method includes: An electronic device logs in to a user account of a first application. The electronic device detects a first preset operation of a user, where the first preset operation is used to indicate to associate a second application with the first application. The electronic device obtains, by using the first application, a unique open identity OpenID corresponding to the user account of the first application. The electronic device sends the OpenID and identity information of the second application to a server of the first application. The electronic device obtains account binding success information from the server of the first application, where the account binding success information is used to indicate that the user account of the first application is bound to a user account of the second application.

In this solution, in an account binding scenario, the first application may replace a third-party application to apply for and obtain the OpenID corresponding to the user account of the first application, to establish a binding relationship between a user account of the third-party application and the OpenID, that is, establish a binding relationship between the user account of the third-party application and the user account of the first application. In this way, the third-party application does not need to do the following complex development work: developing a third-party quick application to implement the binding, specifically developing a login page that is based on the third-party quick application to implement the binding, and invoking, in the third-party quick application, an account management SDK of the first application to obtain the OpenID corresponding to the user account of the first application, so as to simplify a development procedure of the third-party application, reduce development workload of the third-party application, simplify a procedure for binding the accounts of the third-party application and the first application, reduce account binding costs of the target third-party application, and improve efficiency and flexibility of account binding.

In a possible implementation, the account binding success information is generated by the server of the first application after a server of the second application binds the OpenID to the user account of the second application and notifies the server of the first application.

In other words, the server of the second application binds the user account of the second application to the OpenID, and notifies the server of the first application after account binding succeeds. Therefore, the electronic device can obtain the account binding success information from the server of the first application.

In another possible implementation, after the electronic device sends the OpenID to the server of the first application, the method further includes: The electronic device obtains login page information of the second application from the server of the first application, where the login page information includes the OpenID. The electronic device displays a login page of the second application based on the login page information. The electronic device obtains the user account that is of the second application and that is entered by the user on the login page. The electronic device sends the user account that is of the second application and that is entered by the user and the OpenID to the server of the second application.

In this solution, the electronic device may obtain the login page information of the second application from the server of the first application, to display the user login page of the second application based on the information, so that the user enters the user account of the second application. Then, the electronic device may send the user account of the second application and the OpenID to the server of the second application, so that after verification of the user account of the second application succeeds, the service of the second application binds the user account of the second application to the OpenID, that is, binds the user account of the second application to the user account of the first application.

In another possible implementation, the login page information is a login card object corresponding to the second application, and a parameter of the login card object includes the OpenID. That the electronic device displays a login page of the second application based on the login page information includes: The electronic device displays a login card of the second application based on the login card object.

In this solution, the electronic device may display the login page in a login card form of the second application.

In another possible implementation, the login page information is an address of a hypertext markup language 5 H5 login page of the second application, and the address of the H5 login page includes the OpenID. That the electronic device displays a login page of the second application based on the login page information includes: The electronic device displays the H5 login page of the second application based on the address of the H5 login page.

In this solution, the electronic device may display the H5 login page of the second application.

In another possible implementation, the address that is of the H5 login page and that is obtained by the electronic device from the server of the first application is spliced with the OpenID.

In another possible implementation, the login page information is an address of a native application login page of the second application, and the address of the native application login page includes the OpenID. That the electronic device displays a login page of the second application based on the login page information includes: The electronic device displays the native application login page of the second application based on the address of the native application login page.

For example, the login page information is a deep link DeepLink address of the native application login page of the second application. In this solution, the electronic device may display the native application login page of the second application.

In another possible implementation, the address that is of the native application login page and that is obtained by the electronic device from the server of the first application is spliced with the OpenID.

In another possible implementation, the login page information is an address of a quick application login page of the second application, and the address of the quick application login page includes the OpenID. That the electronic device displays a login page of the second application based on the login page information includes: The electronic device displays the quick application login page of the second application based on the address of the quick application login page.

For example, the login page information is a deep link DeepLink address of the quick application login page of the second application. In this solution, the electronic device may display the quick application login page of the second application.

In another possible implementation, the address that is of the quick application login page and that is obtained by the electronic device from the server of the first application is spliced with the OpenID.

In another possible implementation, that the electronic device sends the user account that is of the second application and that is entered by the user and the OpenID to the server of the second application includes: After detecting a second preset operation of the user, the electronic device sends the user account that is of the second application and that is entered by the user and the OpenID to the server of the second application, where the second preset operation is used to indicate to bind the user account of the first application to the user account of the second application.

In other words, the electronic device sends, only after the user indicates to perform binding, the user account of the second application and the OpenID to the server of the second application, so that the server of the second application performs binding.

In another possible implementation, that the electronic device obtains an OpenID by using the first application includes: The electronic device obtains the identity information of the second application. The electronic device sends the identity information of the second application to an account management server of the first application by using the first application. The electronic device obtains the OpenID from the account management server of the first application.

In this solution, the electronic device may send the identity information of the second application to the account management server of the first application, so that the electronic device generates, based on the identity information of the second application, the OpenID corresponding to the user account of the first application.

In another possible implementation, after the electronic device obtains the account binding success information from the server of the first application, the method further includes: The electronic device obtains a user-associated event pushed by the server of the second application. The electronic device notifies the user of the user-associated event by using the first application.

In other words, after the user account of the second application is successfully bound to the OpenID, that is, after the user account of the second application is successfully bound to the user account of the first application, the server of the second application may push, based on the binding relationship, the generated user-associated event to the first application corresponding to the OpenID and the electronic device, so that the electronic device displays the user-associated event to the user by using the first application.

In another possible implementation, the first application is a HiBoard.

In this way, the user account of the second application may be bound to a user account of the HiBoard, and the electronic device may display, by using the HiBoard, the user-associated event pushed by the server of the second application.

According to another aspect, an embodiment of this application provides an account management system, including an electronic device, a server of a first application, an account management server of a first application, and a server of a second application. The electronic device is configured to: log in to a user account of the first application; detect a first preset operation of a user, where the first preset operation is used to indicate to associate the second application with the first application; obtain, by using the first application from the account management server of the first application, a unique open identity OpenID corresponding to the user account of the first application; send the OpenID and identity information of the second application to the server of the first application; and obtain account binding success information from the server of the first application, where the account binding success information is used to indicate that the user account of the first application is bound to a user account of the second application.

In a possible implementation, the server of the first application is further configured to obtain login page information of the second application based on the identity information that is of the second application and that is obtained from the electronic device, where the login page information includes the OpenID. The server of the first application is further configured to send the login page information to the electronic device. The electronic device is further configured to display a login page of the second application based on the login page information obtained from the server of the first application. The electronic device is further configured to obtain the user account that is of the second application and that is entered by the user on the login page. The electronic device is further configured to send the user account that is of the second application and that is entered by the user and the OpenID to the server of the second application. The server of the second application is configured to: after verification of the user account that is of the second application and that is entered by the user succeeds, bind the OpenID to the user account of the second application. The server of the second application is further configured to notify the server of the first application that the user account of the first application is bound to the user account of the second application.

In another possible implementation, the server of the first application is configured to obtain, based on the identity information that is of the second application and that is obtained from the electronic device, a login card object corresponding to the second application, where a parameter of the login card object includes the OpenID.

In another possible implementation, the server of the first application is configured to send the OpenID to the server of the second application based on the identity information that is of the second application and that is obtained from the electronic device. The server of the second application is further configured to send an address of a hypertext markup language 5 H5 login page of the second application to the server of the first application, where the address of the H5 login page includes the OpenID. The server of the first application is further configured to send the address of the H5 login page to the electronic device.

In another possible implementation, the address that is of the H5 login page and that is sent by the server of the second application to the server of the first application is spliced with the OpenID.

In another possible implementation, the server of the first application is configured to send the OpenID to the server of the second application based on the identity information that is of the second application and that is obtained from the electronic device. The server of the second application is further configured to send an address of a native application login page of the second application to the server of the first application, where the address of the native application login page includes the OpenID. The server of the first application is further configured to send the address of the native application login page to the electronic device.

In another possible implementation, the address that is of the native application login page and that is sent by the server of the second application to the server of the first application is spliced with the OpenID.

In another possible implementation, the server of the first application is configured to send the OpenID to the server of the second application based on the identity information that is of the second application and that is obtained from the electronic device. The server of the second application is further configured to send an address of a quick application login page of the second application to the server of the first application, where the address of the quick application login page includes the OpenID. The server of the first application is further configured to send the address of the quick application login page to the electronic device.

In another possible implementation, the address that is of the quick application login page and that is sent by the server of the second application to the server of the first application is spliced with the OpenID.

In another possible implementation, the server of the second application is further configured to: after binding the OpenID to the user account of the second application, if it is determined that a user-associated event corresponding to the OpenID is generated, push the user-associated event to the electronic device corresponding to the OpenID. The electronic device is further configured to: after obtaining the user-associated event pushed by the server of the second application, notify the user of the user-associated event by using the first application.

In another possible implementation, the first application is a HiBoard.

According to another aspect, an embodiment of this application provides an account binding apparatus, and the apparatus is included in an electronic device. The apparatus has a function of implementing behavior of the electronic device in any one of the foregoing aspects and possible designs. The function may be implemented by hardware, or may be implemented by hardware executing corresponding software. The hardware or the software includes at least one module or unit corresponding to the function, for example, a display module/unit, a processing module/unit, a communications module/unit, a storage module/unit, and the like.

According to another aspect, an embodiment of this application provides a computer storage medium, including computer instructions. When the computer instructions are run on an electronic device, the electronic device is enabled to perform the account binding method according to any possible design of the foregoing aspect.

According to another aspect, an embodiment of this application provides a computer program product. When the computer program product is run on a computer, the computer is enabled to perform the account binding method perform by the electronic device according to any possible design of the foregoing aspect.

According to another aspect, an embodiment of this application provides a chip system, and the chip system is used in an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the account binding method in any possible design of the foregoing aspects.

For beneficial effects corresponding to the foregoing other aspects, refer to the descriptions of the beneficial effects in the method aspects.

DESCRIPTION OF EMBODIMENTS

Figure 1A:
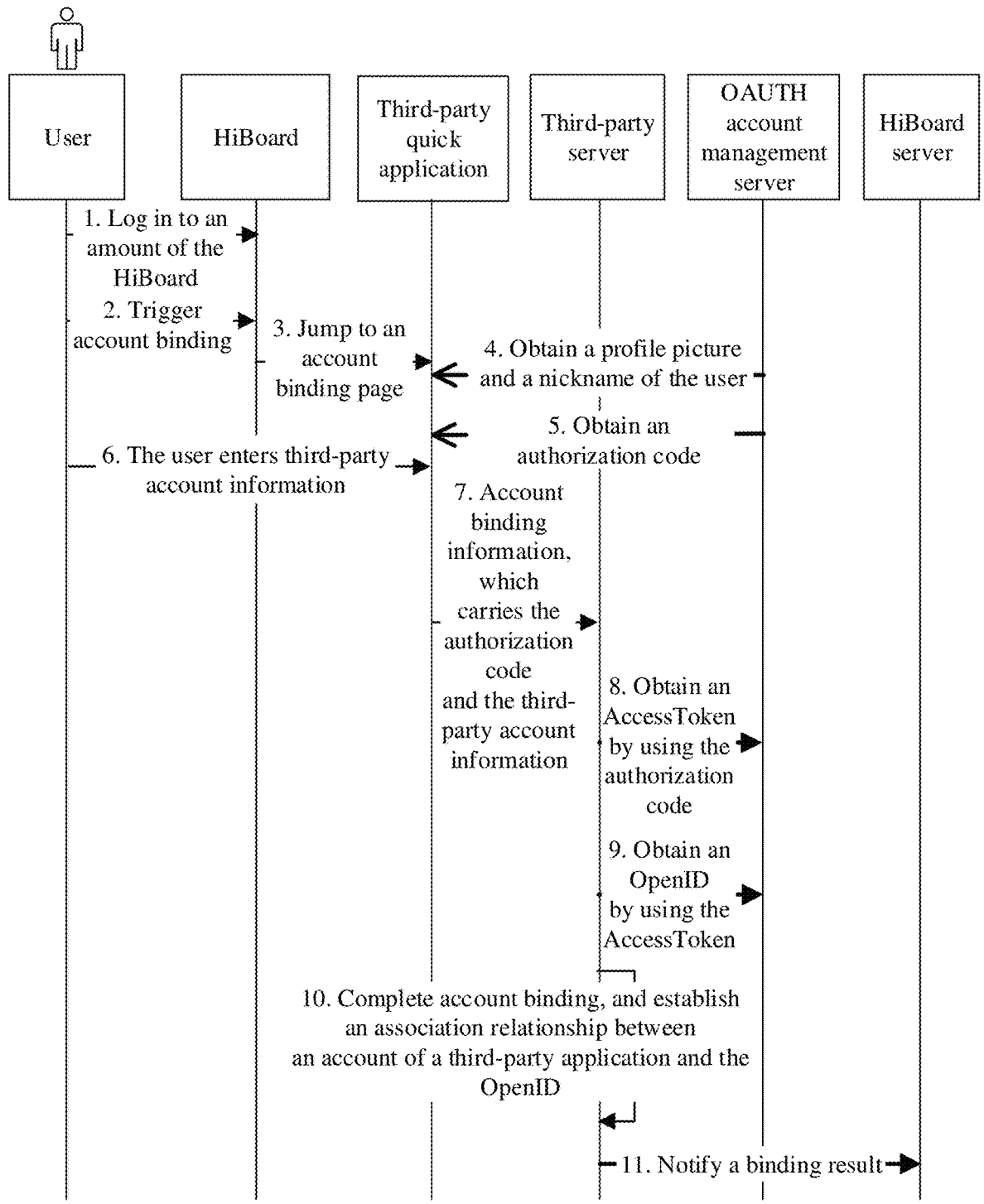
FIG. 1A is an example flowchart of an account binding method according to a conventional technology.

The following describes the technical solutions in embodiments of this application with reference to the accompanying drawings in embodiments of this application. In the descriptions of embodiments of this application, unless otherwise specified, "l" means "or". For example, A/B may represent A or B. In this specification, "and/or" describes only an association relationship between associated objects and represents that at least three relationships may exist. For example, A and/or B may represent the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of embodiments, unless otherwise specified, "a plurality of" means two or more than two.

A home page of a HiBoard is usually a leftmost screen of a home screen, that is, a page (or referred to as a Widget interface) on a leftmost side of the home screen. The HiBoard may provide a user with a notification or quick use of a service such as searching, news, sports and health, a life service, a historical application, or application recommendation. A third-party application can recommend, only after a user account of a third-party application (or referred to as a third-party application) is bound to a user account of the HiBoard and based on the binding relationship after an associated event concerned by a user is generated, the user-associated event to the HiBoard for display.

The user-associated event is an event that is generated by the third-party application and that is related to the user or is concerned by the user. For example, the third-party application is a delivery application, and the user-associated event is an event about delivery of an order of the user. For another example, the third-party application is Ant Forest, and the user-associated event is an event that green energy is generated in Ant Forest of the user. For another example, the third-party application is Eastmoney, and the user-associated event is a related event of a stock concerned by the user.

Based on security consideration, a mobile phone may preconfigure, in a system for a quick application, an interface for invoking an authorization code of a user account of the mobile phone (such as a user account of Huawei), so that the quick application obtains the authorization code of the user account of the mobile phone by using the interface, to obtain, based on the authorization code, an OpenID corresponding to the user account of the mobile phone. Alternatively, based on security consideration, the application needs to integrate a user account management SDK of the mobile phone, and then can invoke the SDK to obtain the authorization code of the user account of the mobile phone, to obtain, based on the authorization code, the OpenID corresponding to the user account of the mobile phone.

Generally, a HiBoard shares a user account of a mobile phone. Based on security consideration, an authorization code and an OpenID that are of a user account of the mobile phone need to be obtained by using an SDK integrated into a quick application or a third-party application. In other words, an authorization code and an OpenID that are of a user account of a HiBoard need to be obtained by using the SDK integrated into the quick application or the third-party application.

In one conventional technology, a third-party application may develop an installation package (for example, an android package (APK)) of a native third-party application, and implement, in the installation package of the native third-party application, a function of binding a user account of the third-party application to that of a HiBoard. In this manner, an account management SDK of the HiBoard needs to be integrated into the installation package of the native third-party application. However, account management SDKs of HiBoards of different device manufactures are different, and a plurality of account management SDKs of a plurality of different device manufactures need to be integrated into the installation package of the native third-party application. As a result, the installation package of the native third-party application is relatively large, which causes the following problems: The third-party application occupies an excessively large memory of a mobile phone, a relatively large amount of traffic is required when a user downloads the installation package, a downloading process is relatively slow, a relatively large quantity of resources are occupied in a running process, and user experience is relatively poor. Therefore, this manner is usually not used by the third-party application.

Figure 1B:
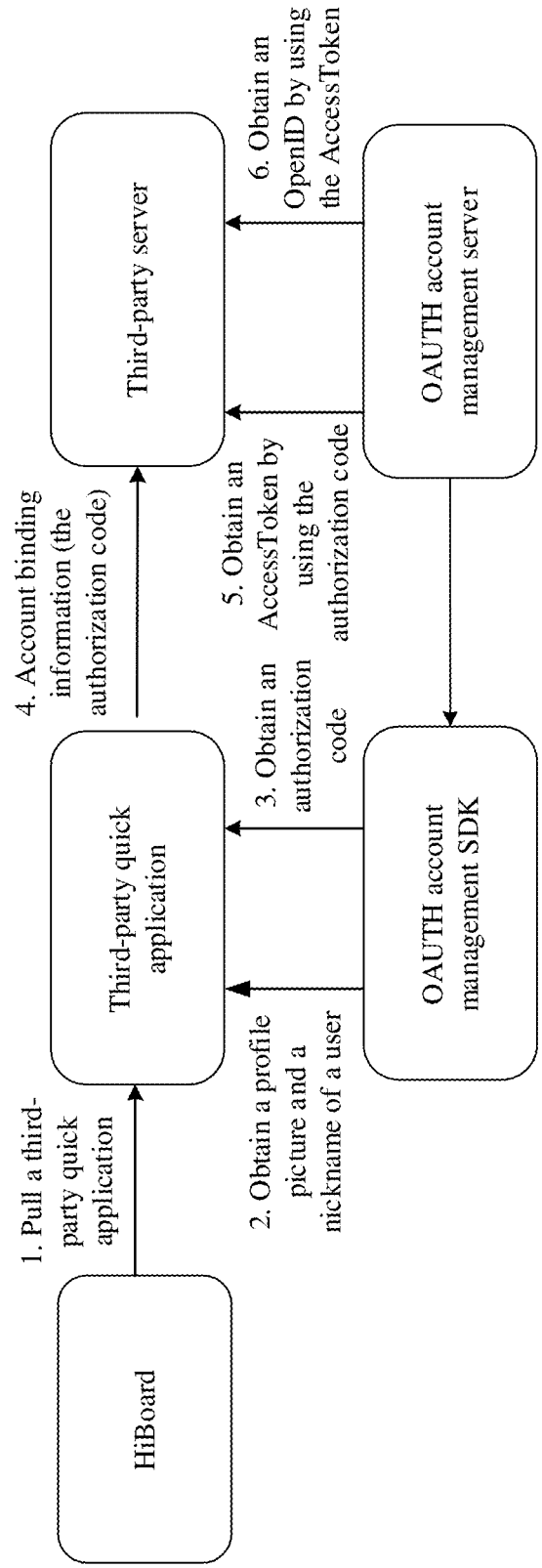
FIG. 1B is an example flowchart of obtaining an OpenID according to a conventional technology.

In another conventional technology, a third-party application side develops a third-party quick application. The quick application may also be referred to as a JavaScript applet. Referring to flowcharts shown in FIG. 1A and FIG. 1B, a user logs in to a user account of a HiBoard, and triggers binding of the user account of a HiBoard to that of a third-party application. The HiBoard pulls the third-party quick application, and the third-party quick application provides a login page (or referred to as an account binding page), so that the user enters an account of the third-party application. The third-party quick application invokes an open authorization (OAUTH) account management SDK to obtain information of the user, such as a profile picture, a nickname, and an authorization code. The third-party quick application obtains the user account that is of the third-party application and that is entered by the user, and submits account binding information to a third-party server. The account binding information carries the authorization code of the user and the user account of the third-party application. After verification of the user account of the third-party application succeeds, the third-party server invokes an account management server interface of the HiBoard application to obtain an access token AccessToken of the user by using the authorization code, and obtain an OpenID of the user by using the AccessToken, that is, obtain an OpenID corresponding to the user account of the HiBoard, thereby establishing a binding relationship between the user account of the third-party application and the OpenID, that is, establishing a binding relationship between the user account of the third-party application and the user account of the HiBoard application.

Figure 1C:
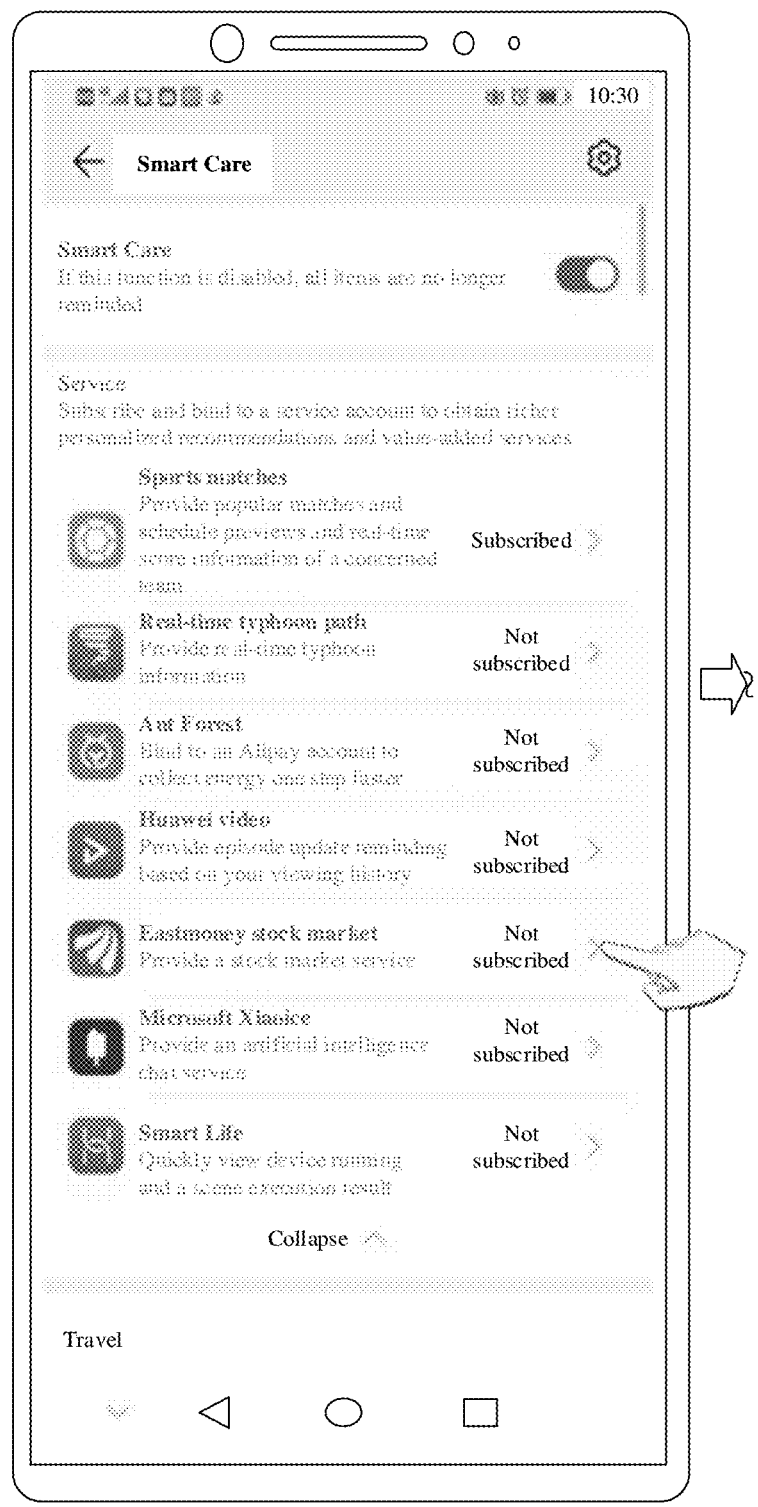
FIG. 1C(a) to FIG. 1C(f) are example schematic diagrams of a group of interfaces in an account binding process according to a conventional technology.
Figure 1C:
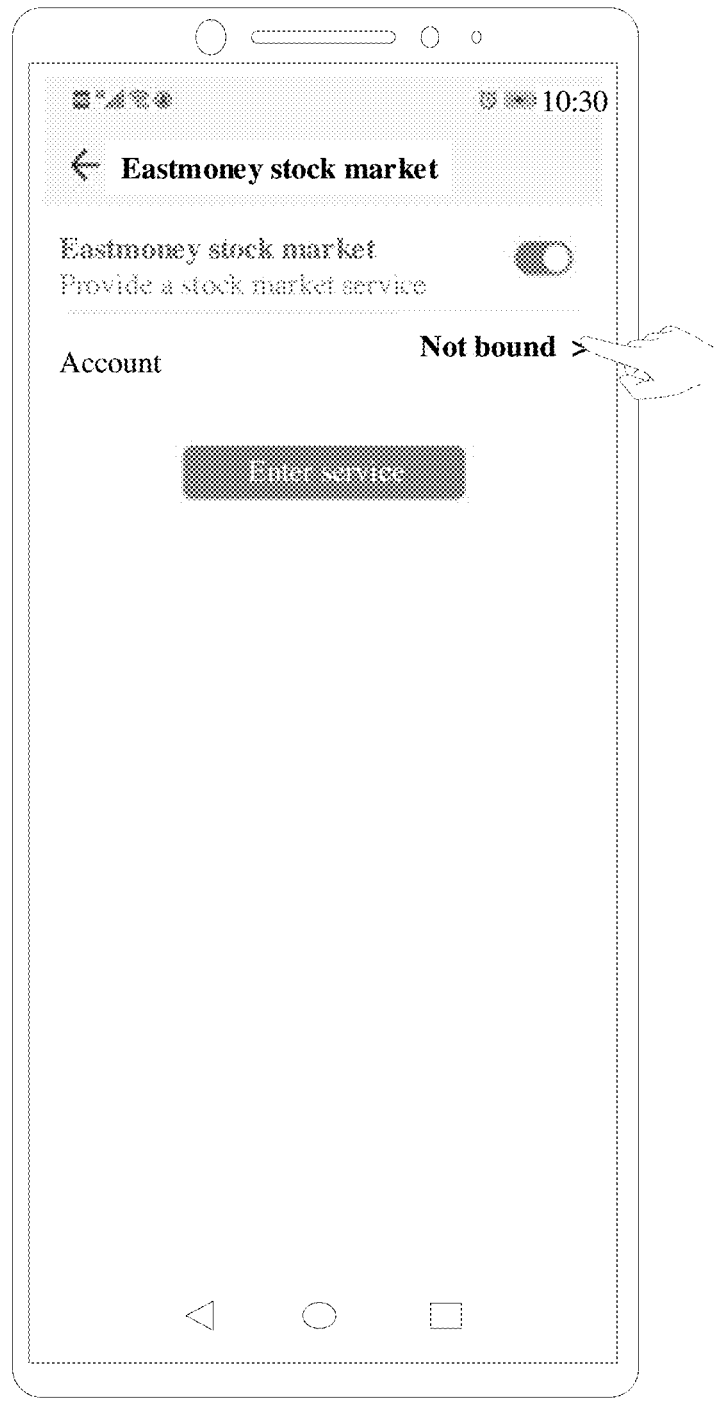
Figure 1C:
Figure 1C:
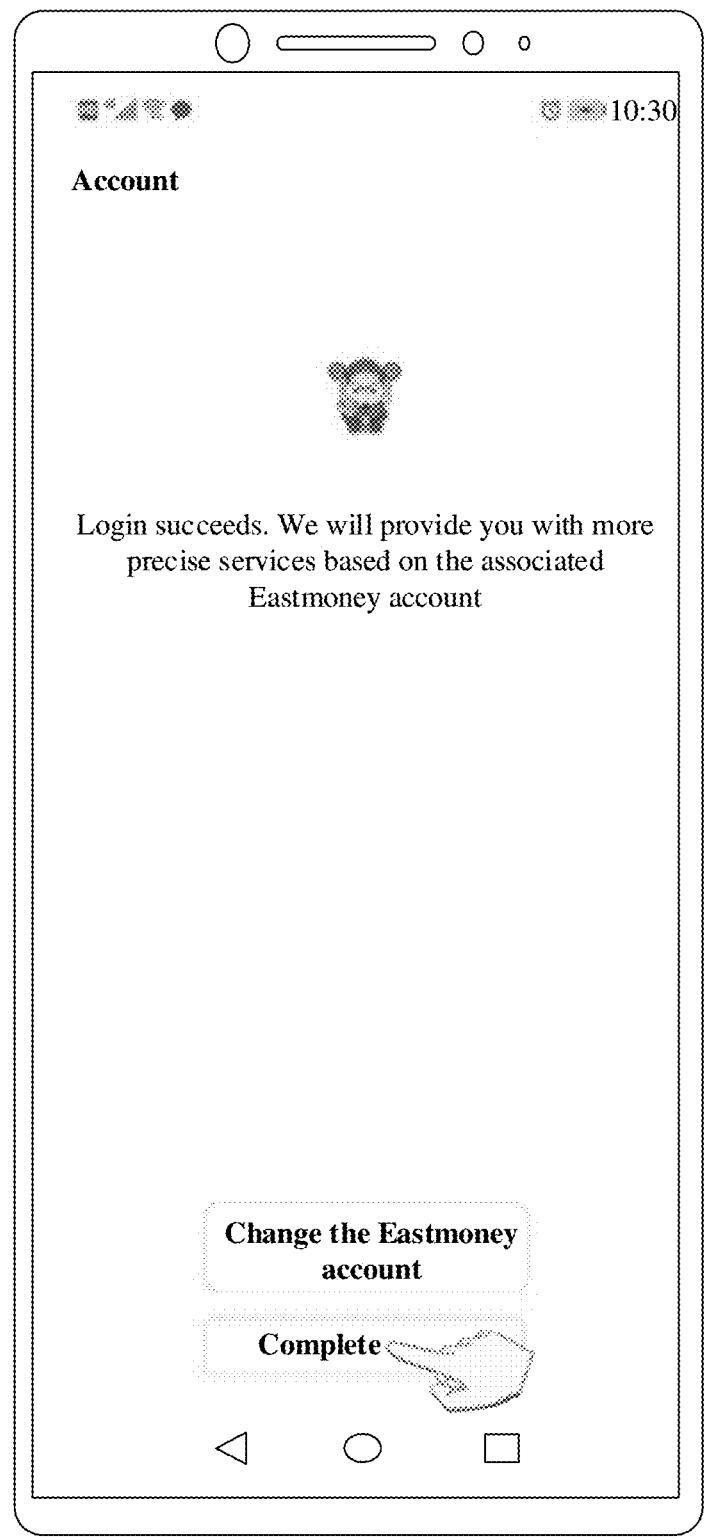
Figure 1C:
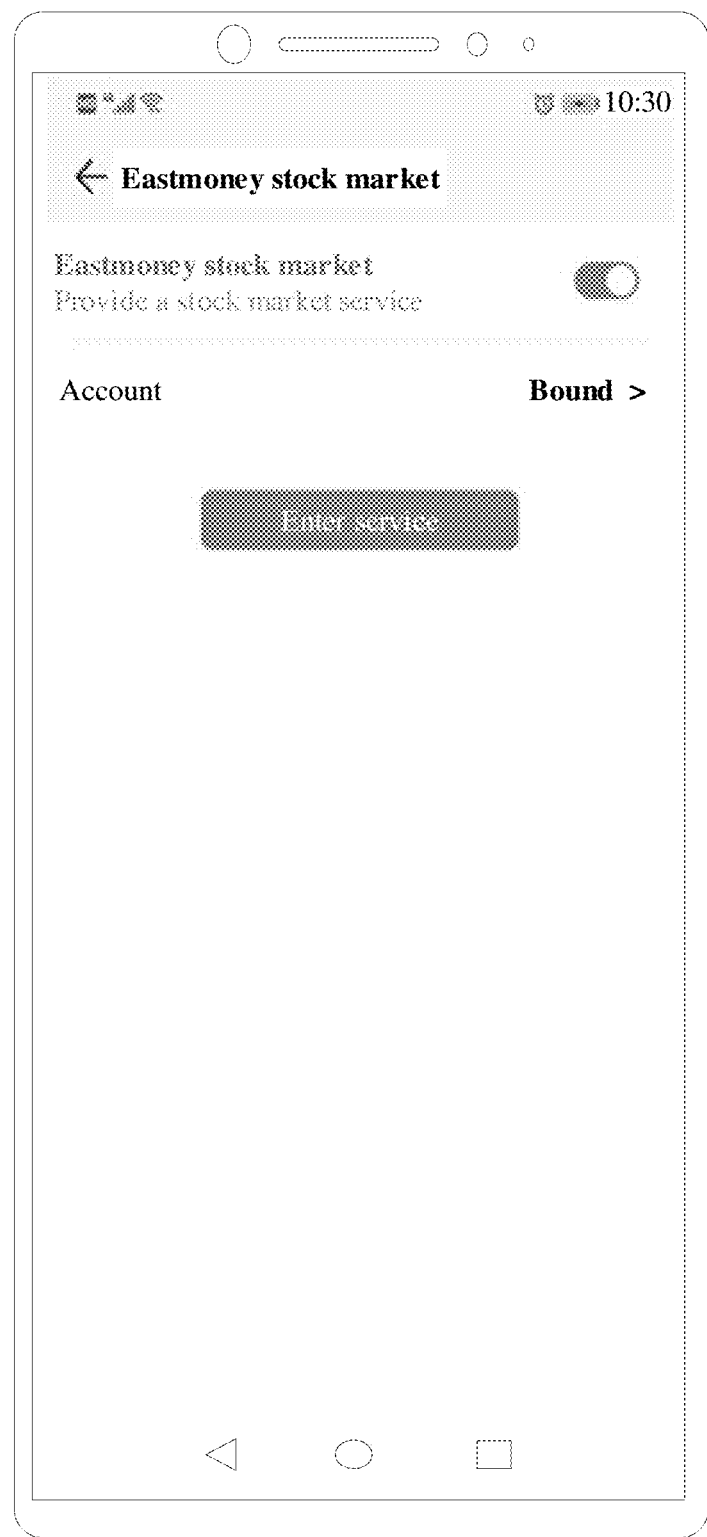
Figure 1C:
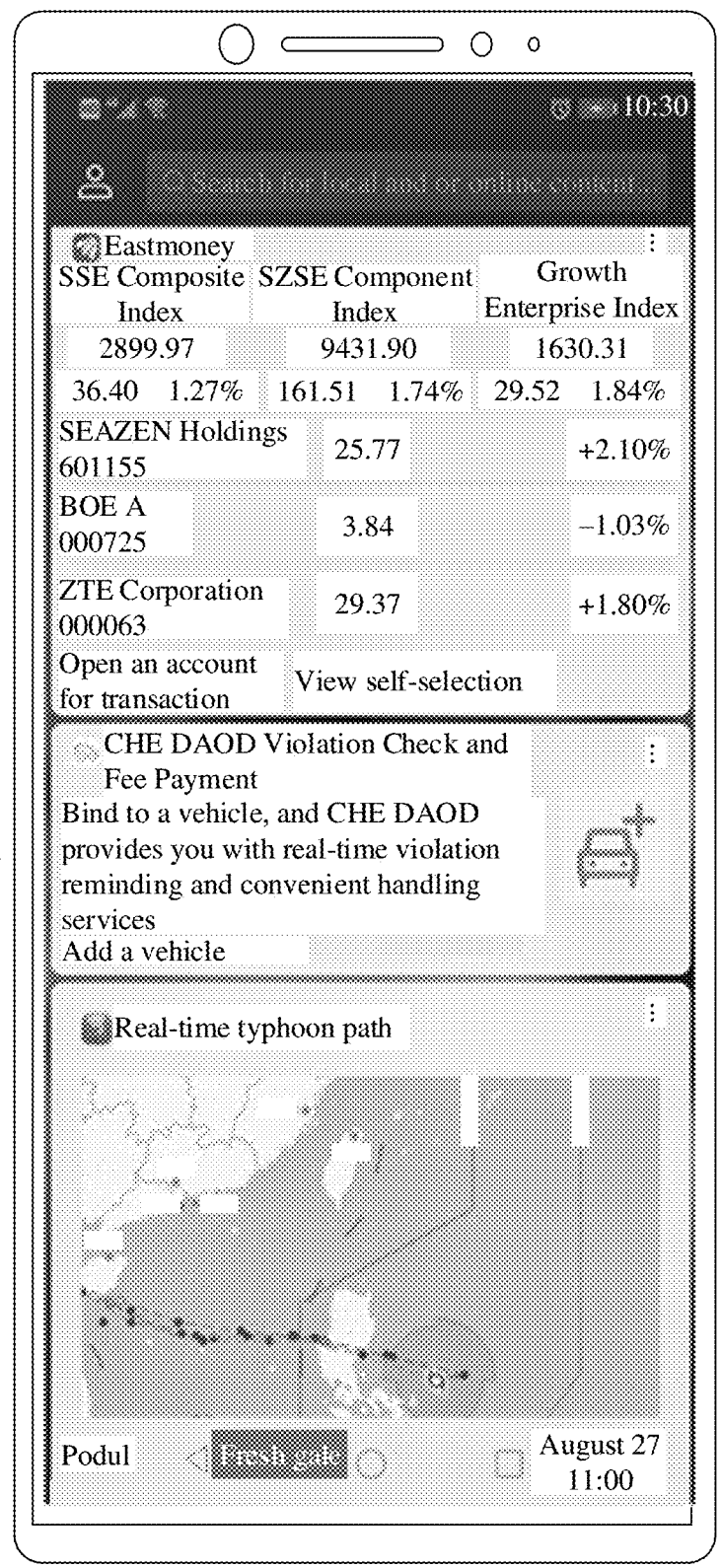

For example, the third-party application is Eastmoney. In a process of binding the user account of the third-party application to the user account of the HiBoard, for a schematic diagram of an interface of an electronic device, refer to FIG. 1C(*a*) to FIG. 1C(*f*), where FIG. 1C(*c*) and FIG. 1C(*d*) are login pages developed by the third-party application based on the quick application.

In the solution provided in the conventional technology, to implement account binding, the third-party application side needs to do the following complex development work: developing the third-party quick application, developing a login page of the third-party quick application based on the quick application, and invoking, in the third-party quick application, the account management SDK of the HiBoard to obtain an authorization code corresponding to the user account of the HiBoard to further obtain the OpenID, so as to bind the user account of the third-party application to the user account of the HiBoard by using the OpenID. This solution has a relatively high requirement for the third-party application, and development workload on the third-party application side is large. A developer of the third-party application usually cannot master a quick application development procedure, and invoking interfaces and invoking manners of account management SDKs of HiBoards corresponding to different device manufacturers are different. Therefore, development work is difficult. A procedure for binding the accounts of the third-party application and the HiBoard has relatively large costs, and the binding procedure is relatively complex, which is not conducive to introduce a large quantity of third-party applications into the HiBoard of the electronic device.

Figure 2:
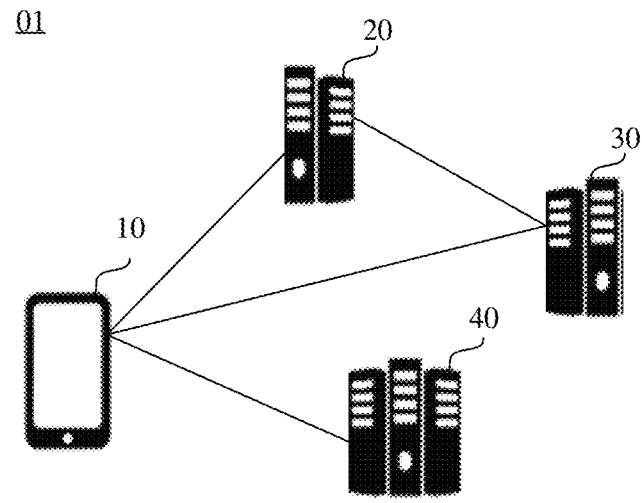
FIG. 2 is an example diagram of an architecture of an account management system according to an embodiment of this application.

The embodiments of this application provide an account binding method, which may be applied to an account management system 01 shown in FIG. 2. The account management system 01 includes an electronic device 10, and the electronic device 10 includes a first application and a second application. The second application is a third-party application different from the first application. The account management system 01 further includes a server 20 of the first application, a third-party server 30, and an account management server 40. The account management server 40 is configured to manage a user account of the first application. The third-party application and the first application do not use a same user account. A user account of the third-party application and the user account of the first application correspond to different account management systems. The third-party server is a server of the third-party application, that is, a server of the second application. After the user account of the third-party application is bound to the user account of the first application, the first application may display a user-associated event recommended by the third-party application.

Figure 3:
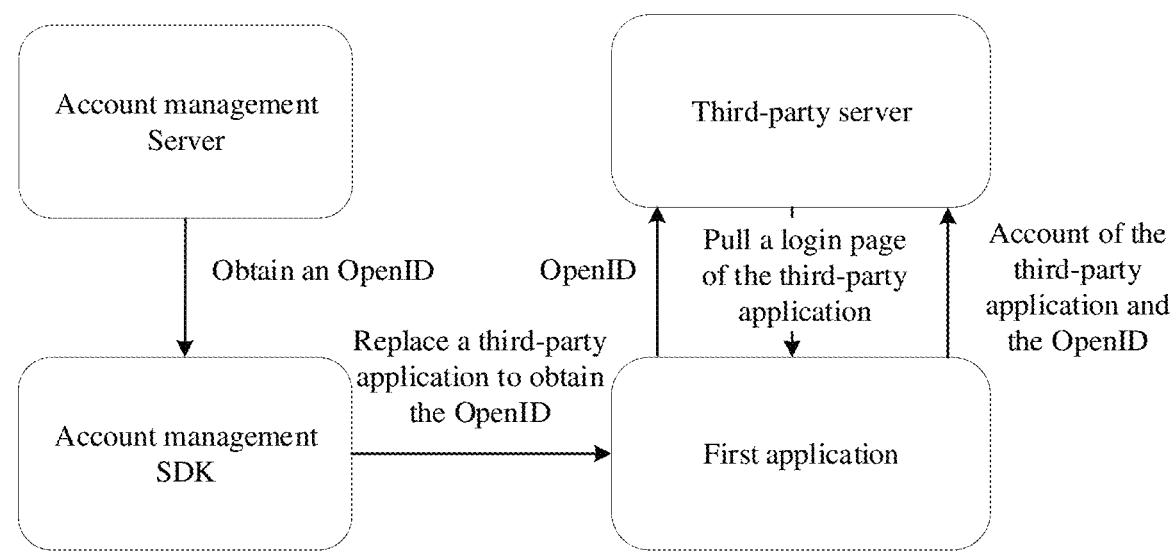
FIG. 3 is an example flowchart of obtaining an OpenID according to an embodiment of this application.

In a process of binding the user account of the third-party application to the user account of the first application, referring to FIG. 3, the first application may invoke an account management SDK of the first application to obtain, from the account management server, an OpenID corresponding to the user account of the first application, and send the OpenID to the third-party server. The third-party server returns, to the first application, the OpenID as a parameter of a login page of the third-party application. The first application pulls the login page that is of the third-party application and that carries the OpenID parameter. After detecting the user account that is of the third-party application and that is entered by a user on the login page of the third-party application, the first application submits the user account of the third-party application and the OpenID to the third-party server. Then, the third-party server may establish a binding relationship between the user account of the third-party application and the OpenID, that is, establish a binding relationship between the user account of the third-party application and the user account of the first application.

It should be noted that in the embodiments of this application, the user account may also be referred to as an account for short. The user account may include a user name and a password. For example, the user name may be a mobile number, a mailbox, a string, or a nickname.

In the account binding method provided in the embodiments of this application, the first application may replace the third-party application to apply for and obtain the OpenID corresponding to the user account of the first application, to establish the binding relationship between the user account of the third-party application and the OpenID, that is, establish the binding relationship between the user account of the third-party application and the user account of the first application. In this way, the third-party application does not need to do the following complex development work: developing a third-party quick application to implement the binding, specifically developing a login page that is based on the third-party quick application to implement the binding, and invoking, in the third-party quick application, an account management SDK of the first application to obtain the OpenID corresponding to the user account of the first application, so as to simplify a development procedure of the third-party application, reduce development workload of the third-party application, simplify a procedure for binding the accounts of the third-party application and the first application, reduce account binding costs of the third-party application, and improve efficiency and flexibility of account binding. Therefore, this helps the third-party application cooperate with the first application, to expand a cooperation group of the first application. In addition, the account management SDK of the first application does not need to be integrated into the third-party application.

For example, the first application is a HiBoard, that is, the HiBoard is an application. The HiBoard may obtain an OpenID corresponding to a user account of the HiBoard, to establish a binding relationship between the user account of the third-party application and the OpenID, that is, establish a binding relationship between the user account of the third-party application and the user account of the HiBoard. In this way, the HiBoard may replace the third-party application to apply for and obtain the OpenID corresponding to the user account of the HiBoard. The third-party application does not need to do the following complex development work: developing a third-party quick application to implement the binding, specifically developing a login page that is based on the third-party quick application to implement the binding, and invoking, in the third-party quick application, an account management SDK of the HiBoard to obtain an authorization code corresponding to the user account of the HiBoard to further obtain the OpenID, so as to simplify a development procedure of the third-party application, reduce development workload of the third-party application, simplify a procedure for binding the accounts of the third-party application and the HiBoard, reduce account binding costs of a target third-party application, and improve efficiency and flexibility of account binding.

For example, the electronic device may be specifically a device such as a mobile phone, a tablet computer, an in-vehicle device, a notebook computer, a smart screen, a wearable device, an augmented reality (AR)/virtual reality (VR) device, an ultra-mobile personal computer (UMPC), a netbook, or a personal digital assistant (PDA). A device type of the electronic device is not limited in this embodiment of this application.

Figure 4:
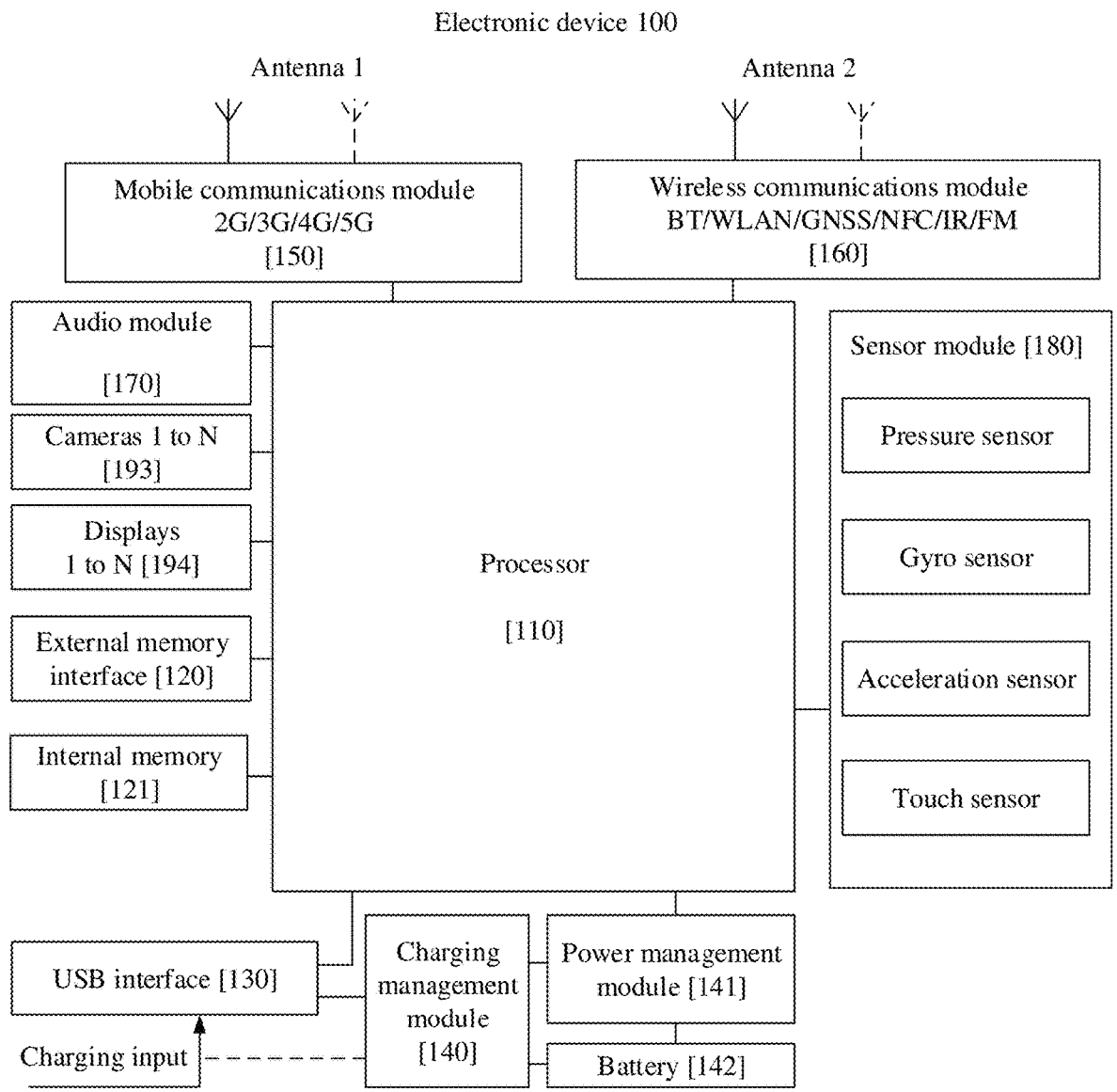
FIG. 4 is an example schematic diagram of a structure of an electronic device according to an embodiment of this application.

For example, FIG. 4 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a sensor module 180, a camera 193, and a display 194, and the like. The sensor module 180 may include a touch sensor, a pressure sensor, a gyro sensor, an acceleration sensor, or the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a voice playing function or an image playing function), and the like. The data storage area may store data (such as OpenID, audio data, and a phone book) and the like that are created during use of the electronic device 100. In addition, the internal memory 121 may include a high-speed random access memory, and may further include a nonvolatile memory, for example, at least one magnetic disk storage device, a flash storage device, or a universal flash storage (UFS).

The internal memory 121 may store an account management SDK of a first application. The processor 110 may invoke the account management SDK of the first application to obtain an authorization code and an OpenID that are of the first application.

The internal memory 121 may store code of the first application. The processor 110 runs the code of the first application, so that the first application obtains, in an account binding scenario, an OpenID corresponding to a user account of the first application, to establish a binding relationship between a user account of a third-party application and the OpenID, that is, establish a binding relationship between the user account of the third-party application and the user account of the first application.

The USB interface 130 is an interface that conforms to a USB standard specification, and may be specifically a mini USB interface, a micro USB interface, a USB Type-C interface, or the like. The USB interface 130 may be configured to connect to the charger to charge the electronic device 100, or may be configured to transmit data between the electronic device 100 and a peripheral device, or may be configured to connect to a headset to play audio by using the headset. Alternatively, the interface may be configured to connect to another electronic device, for example, an AR device.

The charging management module 140 is configured to receive a charging input from the charger. The charger may be a wireless charger or a wired charger.

The power management module 141 is configured to connect to the battery 142, the charging management module 140, and the processor 110. The power management module 141 receives input of the battery 142 and/or the charging management module 140, and supplies power to another module of the electronic device 100. The power management module 141 may be further configured to monitor parameters such as a battery capacity, a battery cycle count, and a battery health status (electric leakage or impedance).

A communications interface such as the mobile communications module 150, the wireless communications module 160, or the USB interface 130 may be used by the electronic device 100 to communicate with a server of the first application, a server of the third-party application, or an account management server, to exchange information such as the OpenID and a login card object or login page address of the third-party application.

It may be understood that an interface connection relationship between the modules illustrated in this embodiment of this application is merely used as an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same component.

The wireless communications module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The camera 193 is configured to capture a static image or a video. An optical image of an object is generated through a lens, and is projected onto a photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

In this embodiment of this application, the display 194 may display interfaces such as a home page of a HiBoard, a login page of the third-party application, or a page in an account binding procedure.

The audio module 170 is configured to convert digital audio information into an analog audio signal for output, and is also configured to convert an analog audio input into a digital audio signal. The audio module 170 may be further configured to code and decode audio signals. For example, the audio module 170 may detect a sound signal of a user, so as to use the sound signal as a voice instruction to control the electronic device 100 to perform an operation such as account binding or login.

The touch sensor in the sensor module 180 is also referred to as a "touch panel". The touch sensor may be disposed on the display 194, and the touch sensor and the display 194 form a touchscreen, which is also referred to as a "touch-screen". The touch sensor is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor may alternatively be disposed on a surface of the electronic device 100 at a location different from that of the display 194.

It may be understood that the structure shown in this embodiment of this application does not constitute a specific limitation on the electronic device 100. In some other embodiments of this application, the electronic device 100 may include more or fewer components than those shown in the figure, or may combine some components, or may split some components, or may have different component arrangements. The components shown in the figure may be implemented by hardware, software, or a combination of software and hardware.

In this embodiment of this application, the display 194 may display interfaces such as the home page of the HiBoard, the login page of the third-party application, or the page in the account binding procedure. The internal memory 121 may store the code of the first application and the account management SDK of the first application. The processor 110 runs the code of the first application, so that the first application invokes, in the account binding scenario, the account management SDK of the first application to obtain the OpenID corresponding to the user account of the first application, to establish the binding relationship between the user account of the third-party application and the OpenID, that is, establish the binding relationship between the user account of the third-party application and the user account of the first application. In this way, the third-party application does not need to do the following complex development work: developing a third-party quick application, specifically developing a login page that is based on the third-party quick application, and invoking, in the third-party quick application, the account management SDK of the first application to obtain the OpenID corresponding to the user account of the first application, so as to simplify a development procedure of the third-party application, reduce development workload of the third-party application, simplify a procedure for binding the accounts of the third-party application and the first application, reduce account binding costs of the third-party application, and improve efficiency and flexibility of account binding.

The account binding method provided in the embodiments of this application is described below by using an example in which the electronic device in the account management system shown in FIG. 2 is a mobile phone having a structure shown in FIG. 4 and the first application is a HiBoard on the mobile phone.

It should be noted that the HiBoard is an application on the mobile phone. In an account binding procedure, an operation, a step, or a function performed by the HiBoard is implemented by invoking a functional module or component in the mobile phone by the HiBoard. In other words, the operation, the step, or the function performed by the HiBoard may also be understood as an operation, a step, or a function performed by the mobile phone.

In this embodiment of this application, the mobile phone may log in to a user account of the HiBoard. After detecting an operation in which a user indicates to associate a target third-party application with the HiBoard, the HiBoard may obtain an OpenID corresponding to the user account of the HiBoard, and send the OpenID to a HiBoard server. The HiBoard server may send the OpenID to a third-party server of the target third-party application, so that the third-party server binds a user account of the target third-party application to the OpenID, that is, binds the user account of the target third-party application to the user account of the HiBoard. After account binding succeeds, the third-party server may notify the HiBoard server. The HiBoard may obtain account binding success information from the HiBoard server.

After sending the OpenID to the HiBoard server, the HiBoard may further obtain user account information of the target third-party application. For example, the HiBoard may obtain login page information of the target third-party application from the HiBoard server, where the login page information includes the OpenID. The HiBoard may display a login page of the target third-party application based on the login page information. After obtaining the user account that is of the target third-party application and that is entered by the user on the login page, the HiBoard may send the OpenID to the third-party server together with the user account that is of the second application and that is entered by the user.

After account binding succeeds, if a user-associated event related to the user account that is of the HiBoard and that corresponds to the OpenID is generated, the third-party server can push the user-associated event to the HiBoard. After obtaining the user-associated event pushed by the third-party server, the HiBoard may notify, in a form such as a card, the user of the user-associated event.

Figure 5:
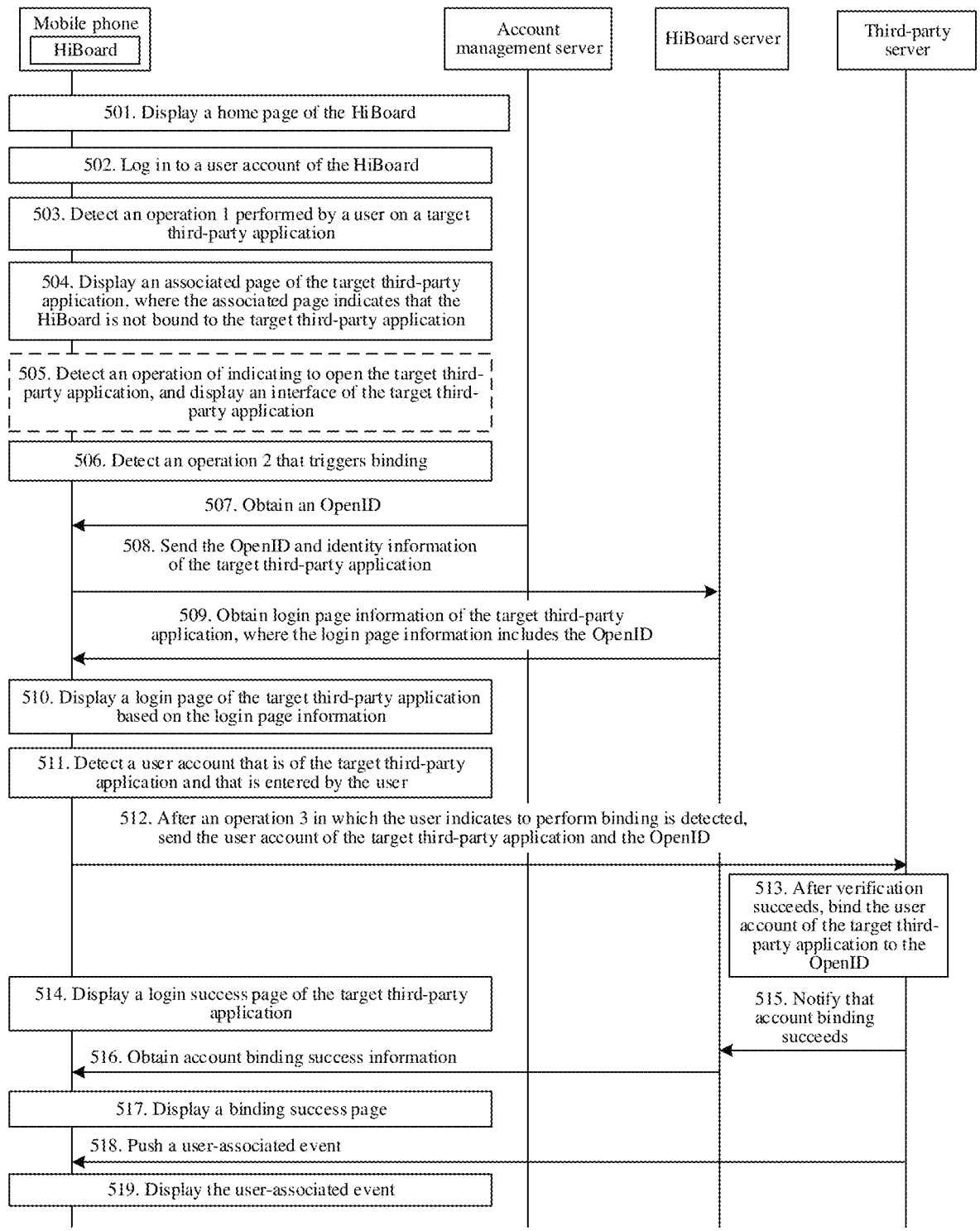
FIG. 5 is an example flowchart of an account binding method according to an embodiment of this application.

Referring to FIG. 5, a specific procedure of an account binding method provided in an embodiment of this application may include the following steps.

501. A mobile phone displays a home page of a HiBoard.

The mobile phone displays, on a screen, the home page of the HiBoard. The screen may be a display, or may be a touchscreen formed through combination of a display and a touch sensor. The home page of the HiBoard is usually a leftmost page of a home screen, and may provide a user with a notification or quick use of a service such as searching, news, sports and health, a life service, a historical application, or application recommendation.

Figure 6A:
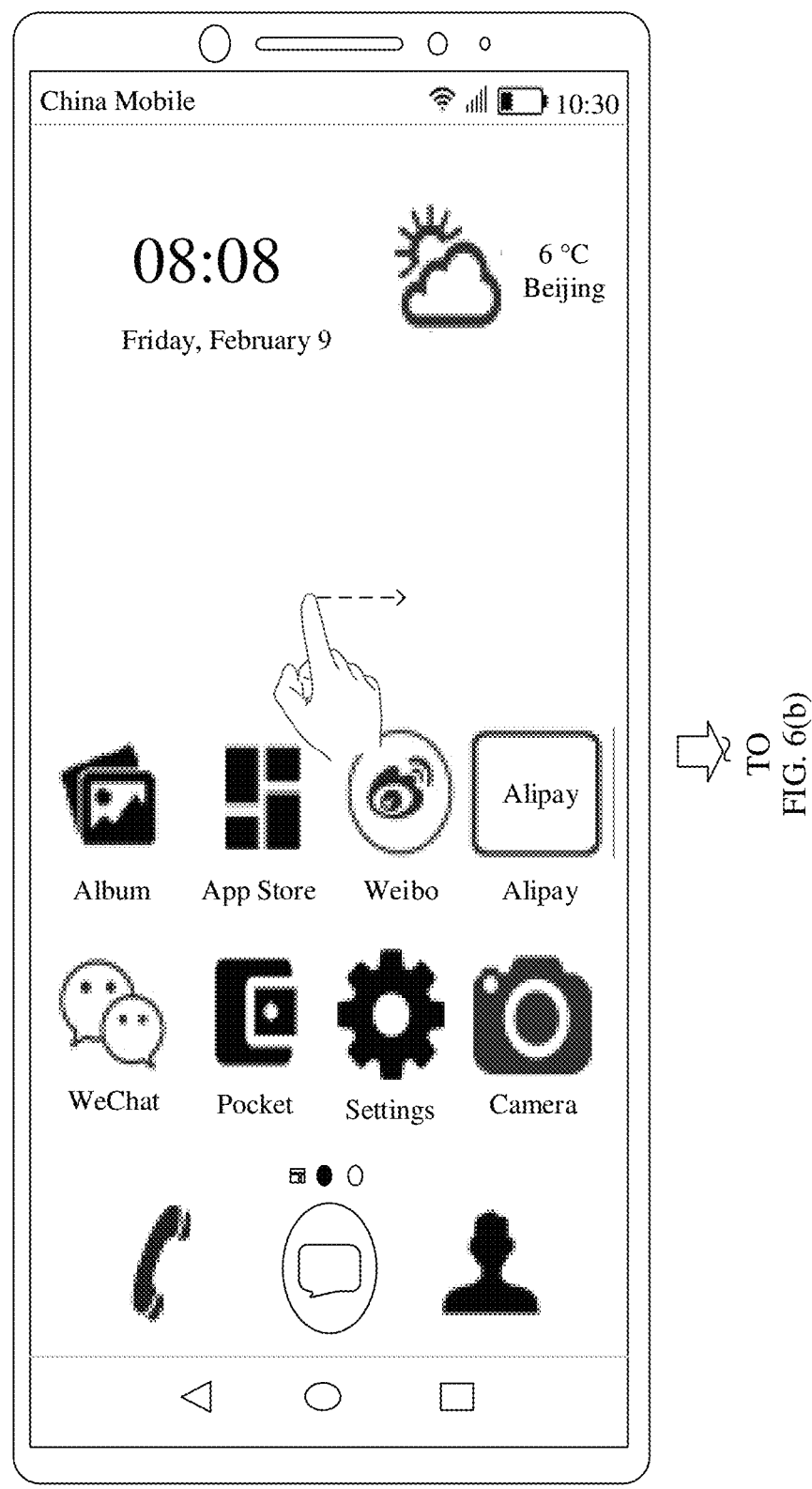
FIG. 6(a) and FIG. 6(b) are example schematic diagrams of a group of interfaces according to an embodiment of this application.
Figure 6B:
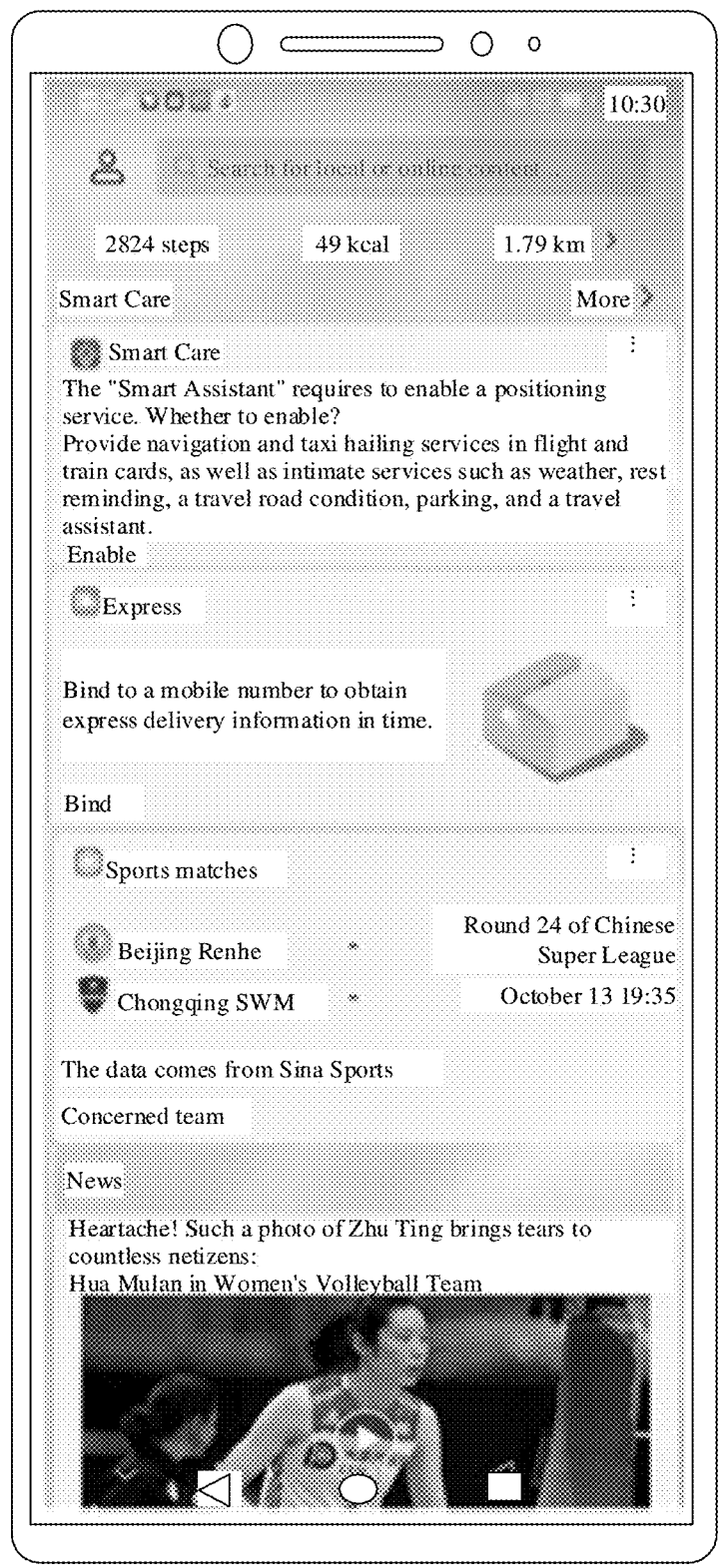

For example, referring to FIG. 6(*a*) and FIG. 6(*b*), a user may slide to the right on the home screen of the mobile phone. In response to the operation of sliding to the right by the user, the mobile phone may move the displayed home screen to the left until a leftmost home screen is displayed, that is, the home page of the HiBoard is displayed.

502. The mobile phone logs in to a user account of the HiBoard.

The user account of the HiBoard is usually consistent with a user account of the mobile phone. For example, if a device manufacturer of the mobile phone is Huawei, the user account of the HiBoard is usually a Huawei account. If the device manufacturer of the mobile phone is Apple, the user account of the HiBoard is usually an Apple account.

Figure 7:
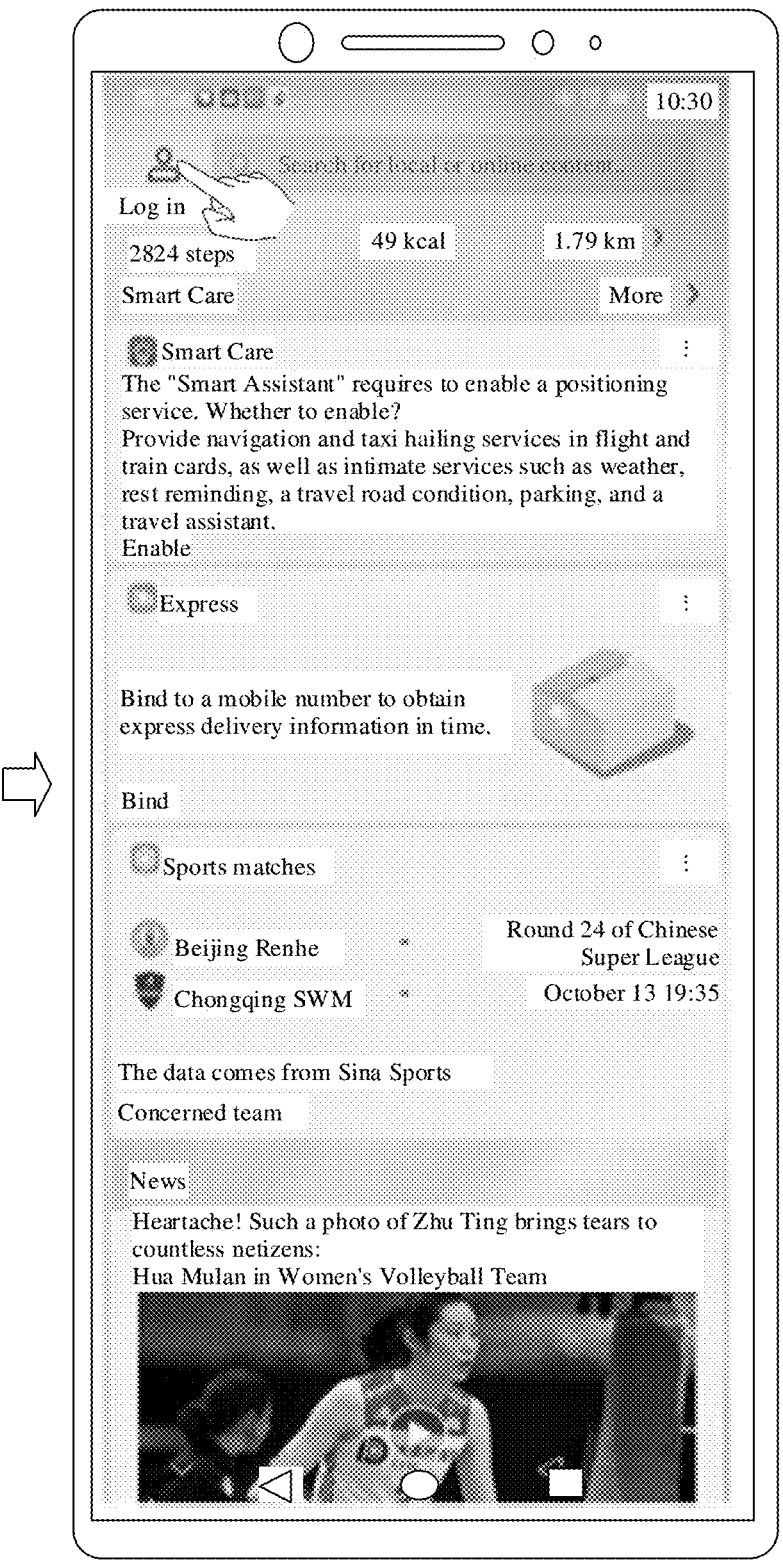
FIG. 7 is an example schematic diagram of an interface according to an embodiment of this application.

If the mobile phone does not previously log in to the user account of the HiBoard, the user may tap a profile picture control at an upper left corner of a page shown in FIG. 7 to log in to the user account of the HiBoard. In some embodiments, if the mobile phone previously logs in to the user account of the mobile phone, the mobile phone automatically logs in to the user account of the HiBoard.

503. The HiBoard detects a preset operation 1 performed by the user on a target third-party application.

The target third-party application is another application different from the HiBoard. For example, the target third-party application may be specifically an application (APP), an application applet, a quick application, or an application in another form. The target third-party application and the HiBoard do not use a same user account, and correspond to different account management systems. For example, when the HiBoard uses a Huawei account, the target third-party application does not use the Huawei account.

That the HiBoard detects an operation of the user may be understood as follows: The mobile phone detects the operation of the user by using a detection component such as a touch sensor, a camera, or a microphone, and notifies the HiBoard of the operation.

The preset operation 1 performed by the user on the target third-party application may have a plurality of operation manners, for example, a touch operation manner, a voice instruction manner, or a mid-air operation manner. For example, the target third-party application may be Ant Forest, Eastmoney, Microsoft Xiaoice, or Smart Life.

Figure 8A:
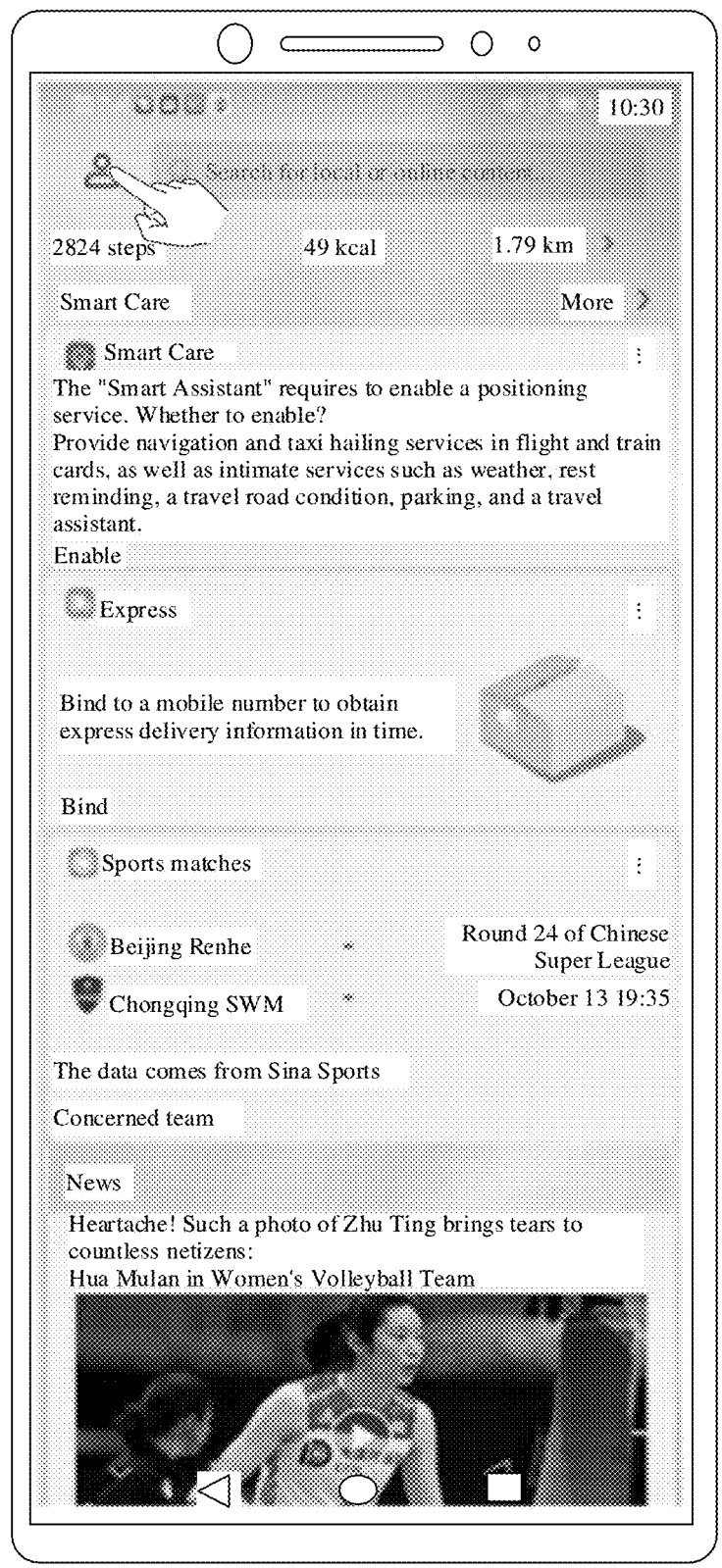
FIG. 8(a) to FIG. 8(c) are example schematic diagrams of another group of interfaces according to an embodiment of this application.
Figure 8B:
Figure 8C:
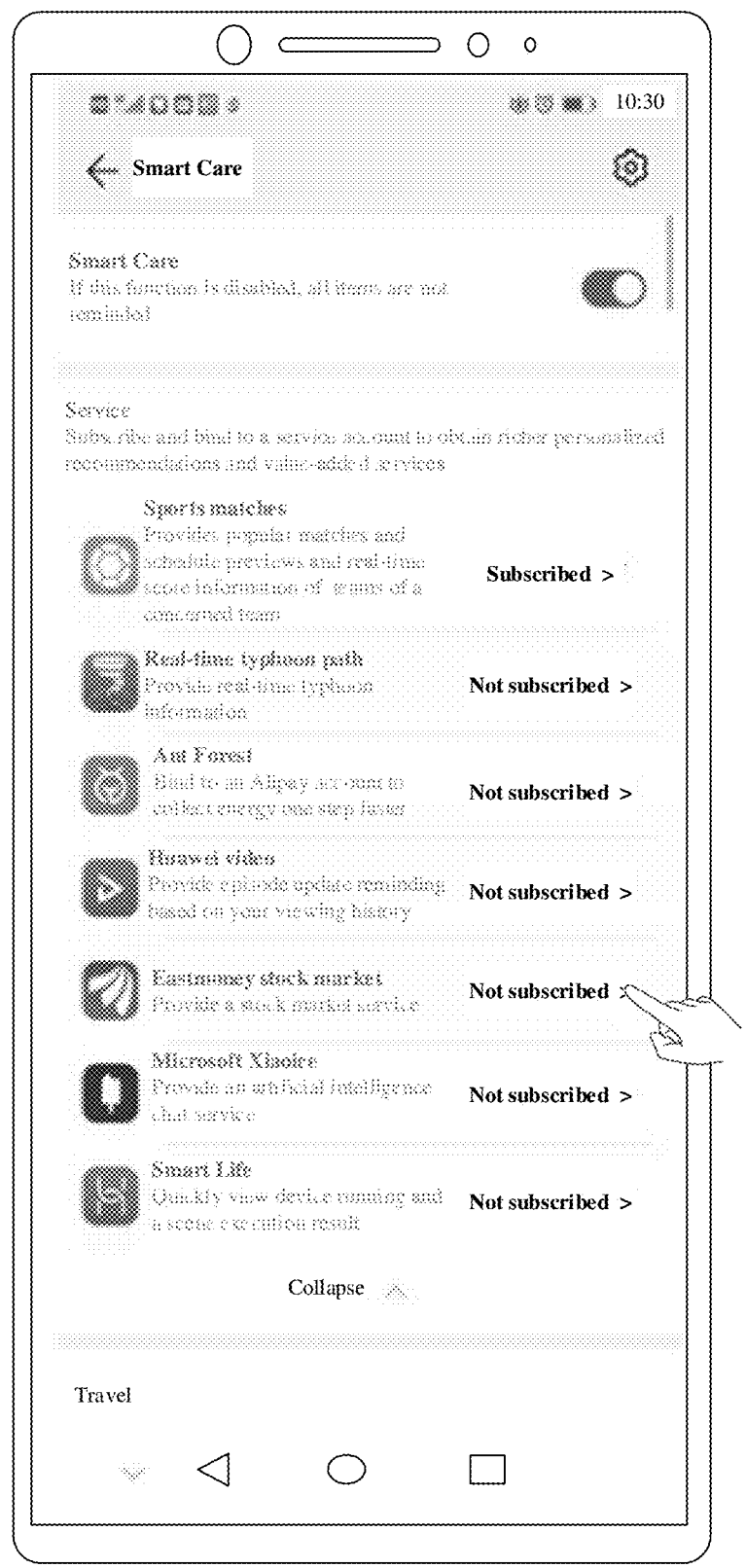

For example, after detecting an operation in which the user taps a profile picture control on the home page of the HiBoard shown in FIG. 8(a), the HiBoard displays a function page of the HiBoard shown in FIG. 8(b). After detecting an operation in which the user taps a "Smart Care" control shown in FIG. 8(b), the HiBoard displays an application list shown in FIG. 8(c).

In some embodiments, the preset operation 1 performed by the user on the target third-party application may include an operation in which the user taps the profile picture control on the home page of the HiBoard, an operation in which the user taps the "Smart Care" control on the function page, and an operation in which the user taps a ">" control corresponding to the target third-party application (for example, Eastmoney) in the application list.

In some other embodiments, the preset operation 1 performed by the user on the target third-party application may be an operation in which the user taps a ">" control corresponding to the target third-party application (for example, Eastmoney) in the application list. Before the preset operation 1 performed by the user on the target third-party application, the HiBoard may further detect another operation, such as an operation in which the user taps the profile picture control on the home page of the HiBoard or an operation in which the user taps the "Smart Care" control on the function page.

For another example, the preset operation 1 may be an operation that is detected by the HiBoard and in which the user indicates, through a voice, to open a subscribe page of the target third-party application.

504. The HiBoard displays an associated page of the target third-party application, where the associated page indicates that the HiBoard is not bound to the target third-party application.

After detecting the preset operation 1 performed by the user on the target third-party application, the HiBoard may display the associated page corresponding to the target third-party application. For example, for the associated page, refer to FIG. 9(a) or FIG. 9(b). The associated page indicates that a user account of the target third-party application is not bound to the user account of the HiBoard currently.

It should be noted that the HiBoard is a platform-type application, and can load and display an interface of a third-party application, for example, display the associated page of the target third-party application. That the HiBoard displays the interface of the third-party application may be understood as follows: The HiBoard loads the interface of the third-party application, and displays the interface by using a mobile phone screen.

Optionally, after step 504, the method may further include step 505.

505. The HiBoard detects an operation in which the user indicates to open the target third-party application, and displays an interface of the target third-party application.

After detecting the operation in which the user indicates to open the target third-party application, the HiBoard may display the interface of the target third-party application, to enter the target third-party application. For example, after detecting that the user taps an "enter service" control shown in FIG. 9(a) or FIG. 9(b), the HiBoard may open the target third-party application, and display the interface of the target third-party application shown in FIG. 10.

After step 504, the method may further include the following step:

506. The HiBoard detects a preset operation 2 of the user.

The preset operation 2 is used to indicate to associate the target third-party application with the HiBoard, and is used to trigger binding of the user account of the target third-party application to the user account of the HiBoard. After detecting the preset operation 2, the HiBoard initiates a procedure for binding the accounts of the target third-party application and the HiBoard.

Figure 9A:
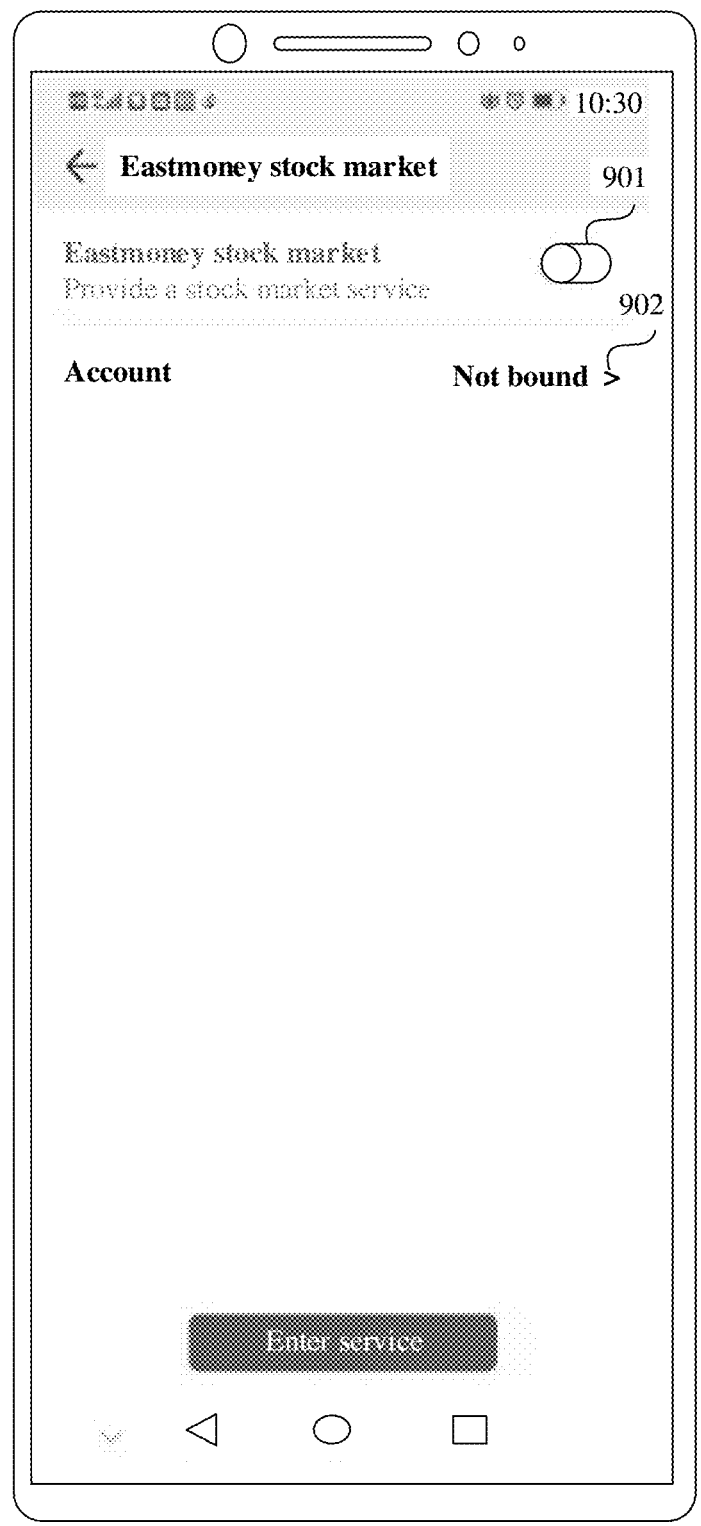
FIG. 9(a) and FIG. 9(b) are example schematic diagrams of another group of interfaces according to an embodiment of this application.
Figure 10:
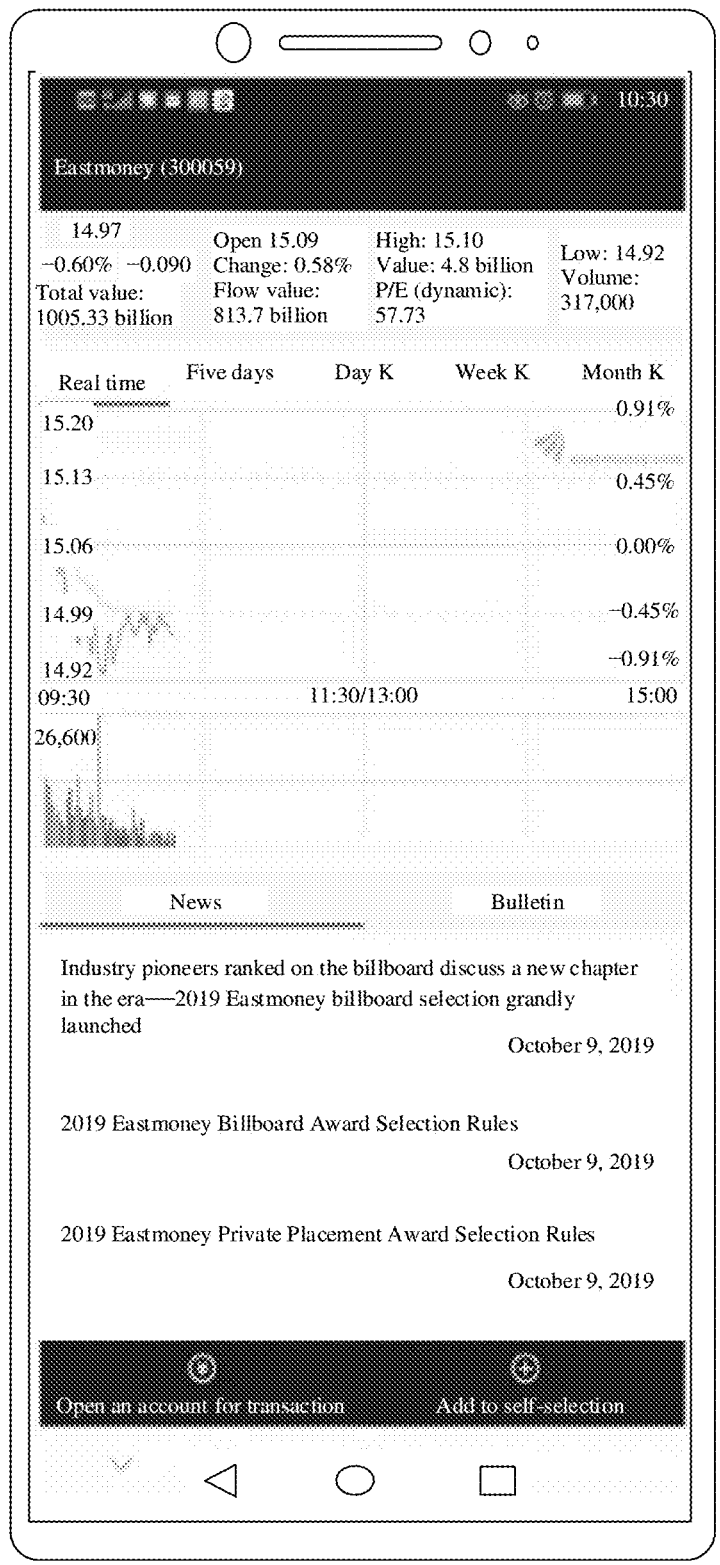
FIG. 10 is an example schematic diagram of another interface according to an embodiment of this application.

For example, the preset operation 2 may be an operation in which the user opens a "subscribe" switch 901 on the associated page shown in FIG. 9(a) and taps a ">" control 902 after "not bound". After detecting the operation in which the user taps the "subscribe" switch 901, the HiBoard may subscribe to the target third-party application, that is, the target third-party application may be enabled on the HiBoard. After detecting the operation in which the user taps the ">" control 902 after "not bound", the HiBoard initiates an account binding procedure.

Figure 9B:
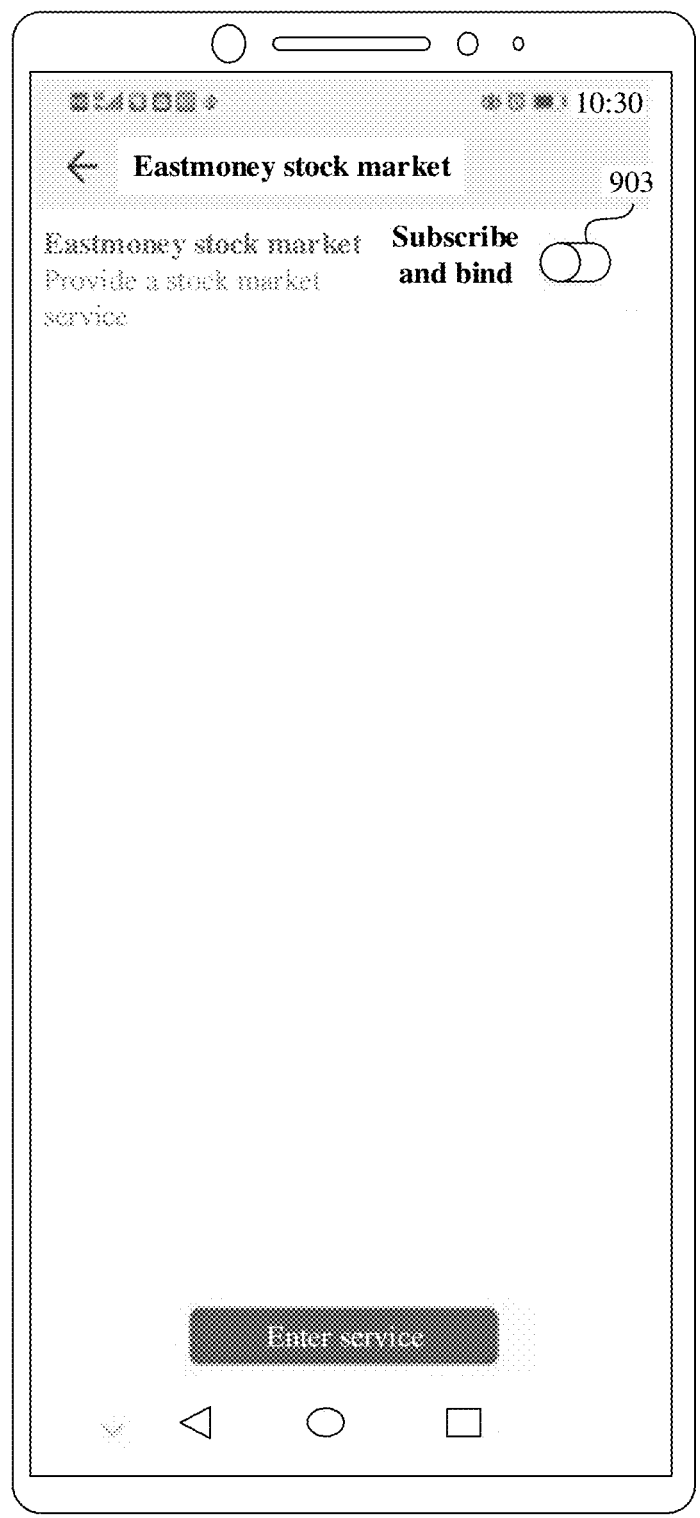

For another example, the preset operation 2 may be an operation in which the user taps a "subscribe and bind" control 903 on the associated page shown in FIG. 9(b). After detecting the preset operation 2, the HiBoard initiates an account binding procedure.

It should be noted that after step 506, the mobile phone may not log in to the user account of the HiBoard, that is, the mobile phone may not perform step 502 before step 506. If the mobile phone determines, after step 506, that the mobile phone does not log in to the user account of the HiBoard, the mobile phone may first log in to the user account of the HiBoard, and then perform step 507 and a subsequent step.

507. The HiBoard obtains, from an account management server, an OpenID corresponding to the user account of the HiBoard.

For example, the account management server of the HiBoard is an OAuth account management server. The HiBoard may invoke an OAuth account management SDK of the HiBoard to obtain, from the OAuth account management server of the HiBoard, the OpenID corresponding to the user account of the HiBoard. When the HiBoard shares a same user account with the mobile phone, the HiBoard may obtain, from an OAuth account management server of the user account of the mobile phone, an OpenID corresponding to the user account of the mobile phone.

The HiBoard may obtain identity information of the target third-party application, for example, a unique application identity (application identity document, AppId) of the target third-party application, or an application name of the target third-party application. That the identity information of the target third-party application is the AppId is used as an example for description. The HiBoard may invoke an OAuth account management SDK in the mobile phone, transfer the AppId of the target third-party application to the OAuth account management server, and apply to the OAuth account management server to obtain the OpenID corresponding to the user account of the HiBoard. The OAuth account management server generates, based on the AppId of the target third-party application, the OpenID corresponding to the user account of the HiBoard, and returns the OpenID to the HiBoard.

In this way, the HiBoard may obtain the OpenID corresponding to the user account of the HiBoard, to subsequently perform account binding based on the OpenID. The target third-party application does not need to do the following complex development work: developing a third-party quick application, and invoking, in the third-party quick application, the account management SDK of the HiBoard to obtain an authorization code corresponding to the user account of the HiBoard to further obtain the OpenID, so as to simplify a development procedure of the target third-party application, reduce development workload of the target third-party application, simplify a procedure for binding the accounts of the target third-party application and the HiBoard, reduce account binding costs of the target third-party application, and improve efficiency and flexibility of account binding.

508. The HiBoard sends account authorization information to a HiBoard server, where the account authorization information includes the OpenID and the identity information of the target third-party application.

The account authorization information is used to indicate that the user indicates to bind the user account of the target third-party application to the user account of the HiBoard, that is, the user indicates to bind the user account of the target third-party application to the OpenID; the account authorization information is used to indicate that the user authorizes the OpenID to the target third-party application; the account authorization information is used to indicate that the user authorizes the HiBoard server to provide the OpenID to the target third-party application; or the account authorization information is used to indicate that the user authorizes binding of the user account of the target third-party application to the OpenID.

509. The HiBoard obtains login page information of the target third-party application by using the HiBoard server, where the login page information includes the OpenID.

Figure 11A:
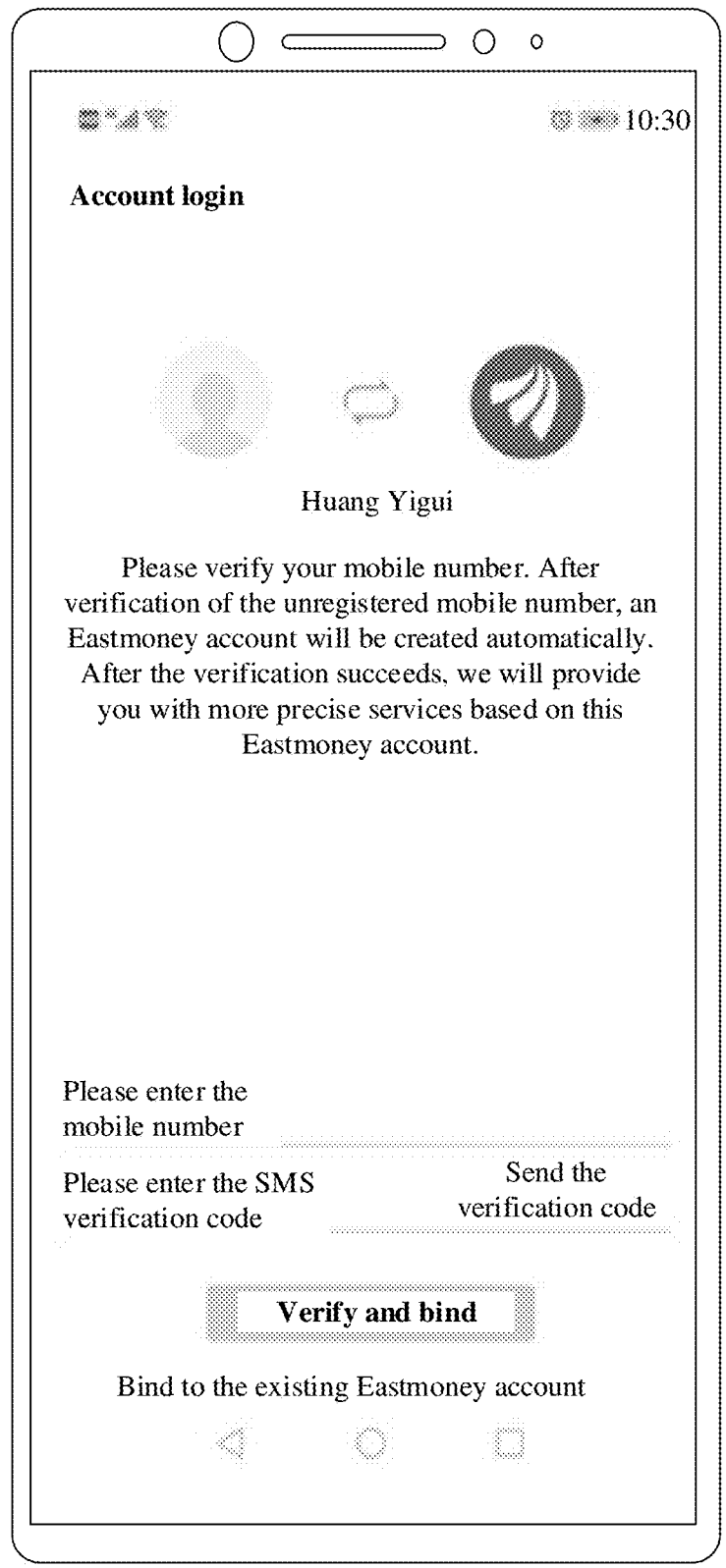
FIG. 11(a) and FIG. 11(b) are example schematic diagrams of another group of interfaces according to an embodiment of this application.
Figure 11B:
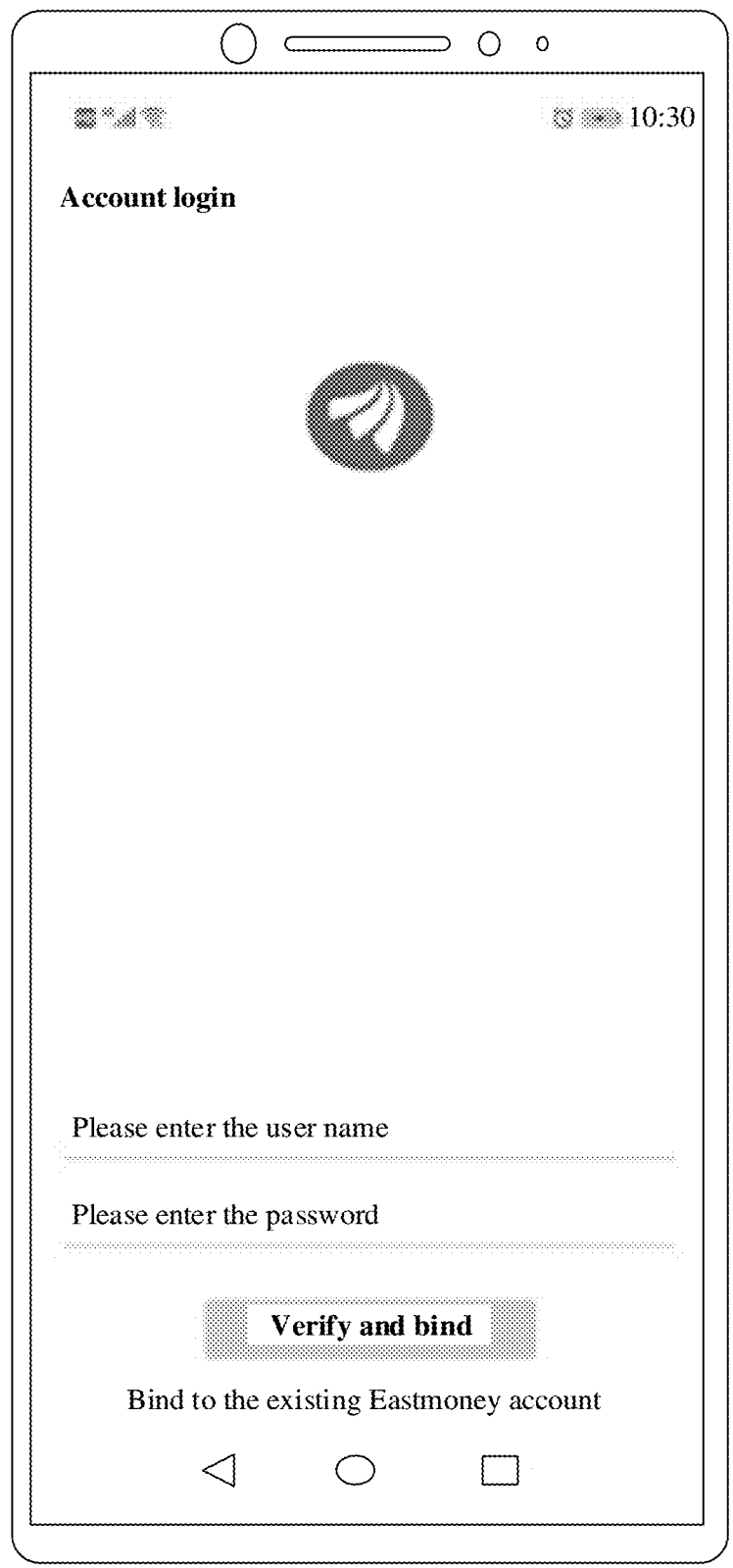

The login page information of the target third-party application is used by the HiBoard to obtain a login page of the target third-party application. For example, the login page may be shown in FIG. 11(*a*) or FIG. 11(*b*).

It should be noted that in some embodiments, when displaying the login page of the target third-party application, the HiBoard does not invoke the account management SDK of the HiBoard to obtain user information such as a profile picture and a nickname of the user. In this case, as shown in FIG. 11(*b*), the login page of the target third-party application may not display the user information such as the profile picture or the nickname of the user.

510. The HiBoard displays the login page of the target third-party application based on the login page information.

The login page information of the target third-party application includes the OpenID corresponding to the user account of the HiBoard.

511. The HiBoard detects the user account that is of the target third-party application and that is entered by the user.

When the HiBoard displays the login page of the target third-party application, the user may enter a user name and a password of the target third-party application on the login page that is of the target third-party application and that is displayed on the HiBoard.

512. After detecting an operation 3 in which the user indicates to perform binding, the HiBoard sends the user account of the target third-party application and the OpenID to a third-party server.

After detecting the operation 3 in which the user indicates to bind the user account of the target third-party application to the user account of the HiBoard, the HiBoard may send account binding information to the third-party server, where the account binding information includes the user account of the target third-party application and the OpenID.

For example, the operation 3 may be an operation in which the user taps a "verify and bind" control in FIG. 11(*a*) or FIG. 11(*b*). For another example, the login page of the target third-party application includes a "log in and bind" control. The operation 3 may be an operation in which the user taps the "log in and bind" control. For another example, the login page of the target third-party application includes a "confirm" control. The operation 3 may be an operation in which the user taps the "confirm" control.

513. After verification of the user account that is of the target third-party application that is sent by the HiBoard succeeds, the third-party server binds the user account of the target third-party application to the OpenID.

It should be noted that the login page information obtained by the HiBoard in step 509 includes the OpenID, that is, the login page is bound to the OpenID. In this way, after subsequently displaying the login page based on the login page information and obtaining the account that is of the target third-party application and that is entered by the user, the HiBoard may submit the user account of the target third-party application to the third-party server together with the OpenID corresponding to the user account of the HiBoard, so that the third-party server performs binding.

In the solution described in step 501 to step 513, the HiBoard may obtain the OpenID corresponding to the user account of the HiBoard, and the third-party server binds the user account of the target third-party application based on the OpenID. The target third-party application does not need to do the following complex development work: developing a third-party quick application, and invoking, in the third-party quick application, the account management SDK of the HiBoard to obtain an authorization code corresponding to the user account of the HiBoard to further obtain the OpenID, so as to simplify a development procedure of the target third-party application, reduce development workload of the target third-party application, simplify a procedure for binding the accounts of the target third-party application and the HiBoard, reduce account binding costs of the target third-party application, and improve efficiency and flexibility of account binding.

After step 513, the method may further include step 514.

514. The HiBoard displays login success page of the target third-party application.

Figure 12A:
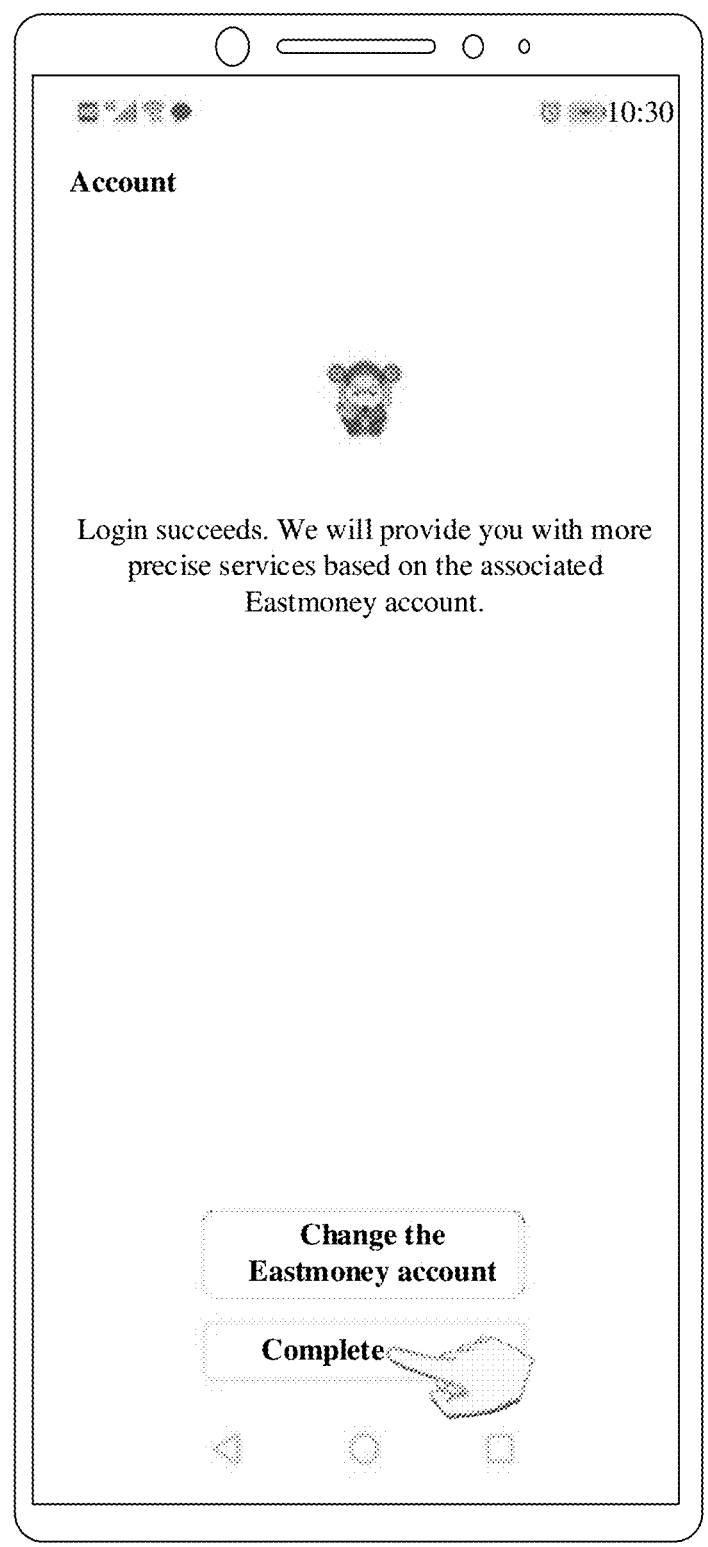
FIG. 12(a) to FIG. 12(c) are example schematic diagrams of another group of interfaces according to an embodiment of this application.
Figure 12B:
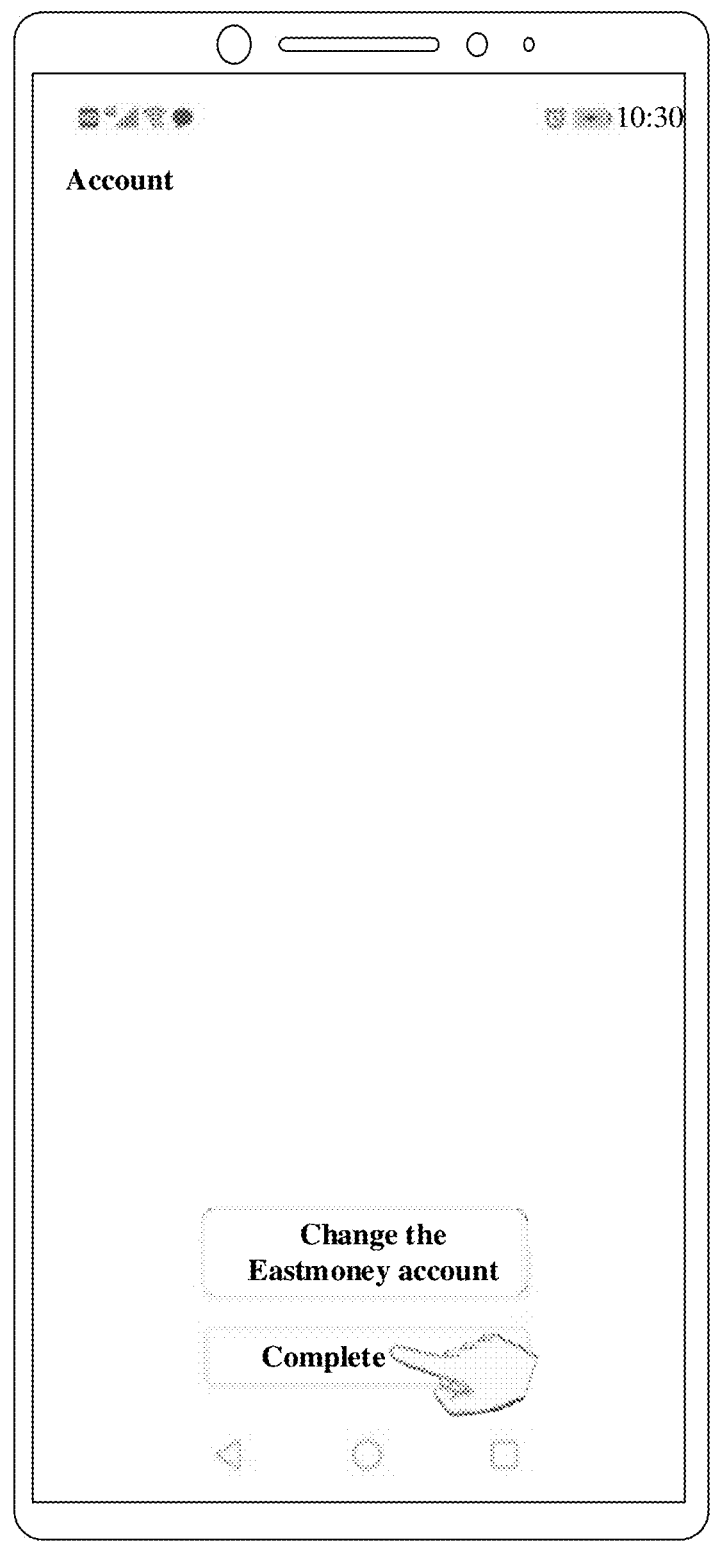

After verification of the user account of the target third-party application succeeds, the third-party server determines that the target third-party application is successfully logged in, and notifies, on the login interface, that the user successfully logs in. In this case, an interface displayed on the HiBoard notifies that the user successfully logs in, that is, the HiBoard displays the login success page of the target third-party application. For example, for the login success page of the target third-party application, refer to FIG. 12(a) or FIG. 12(b).

After step 513, the method may further include the following steps.

515. The third-party server notifies the HiBoard server that account binding succeeds.

The third-party server may push an account binding success message to the HiBoard server, where the binding success message may include the OpenID. The account binding success message may further include the user account of the target third-party application.

516. The HiBoard obtains account binding success information from the HiBoard server.

The account binding success information is used to indicate that the third-party server successfully binds the user account of the HiBoard to the user account of the target third-party application. For example, the HiBoard may periodically query binding information from the HiBoard server, so as to learn that the user account of the target third-party application is successfully bound to the user account of the HiBoard. Alternatively, the HiBoard may receive a message pushed by the HiBoard server, so as to learn that the user account of the target third-party application is successfully bound to the user account of the HiBoard.

517. The HiBoard displays a binding success page.

Figure 12C:
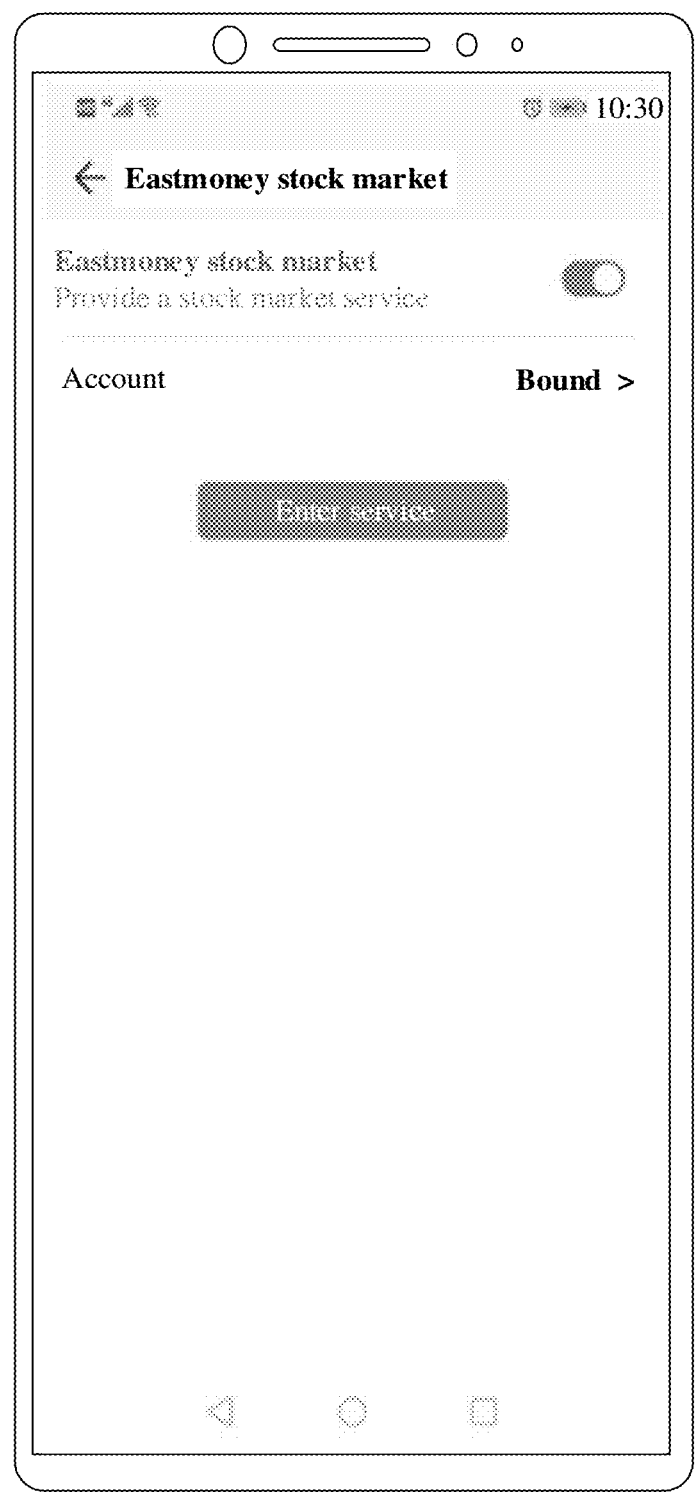

The binding success page indicates that the HiBoard is bound to the target third-party application. For example, after detecting that the user taps a "complete" control shown in FIG. 12(a) or FIG. 12(b), the HiBoard may display the binding success page that is shown in FIG. 12(c) and that indicates that the user account of the HiBoard is bound to that of the target third-party application.

518. The third-party server pushes, based on a binding relationship, a user-associated event to the HiBoard corresponding to the OpenID.

When the user-associated event is generated, the third-party server pushes the user-associated event to the HiBoard corresponding to the OpenID in the binding relationship, to recommend the user-associated event to the user by using the HiBoard. Correspondingly, the HiBoard may receive the user-associated event pushed by the third-party server.

519. The HiBoard displays, on the home page of the HiBoard, the user-associated event recommended by the target third-party application.

After account binding succeeds, the third-party server may push, based on the binding relationship, the user-associated event to the HiBoard corresponding to the OpenID, that is, recommend, to the HiBoard, a user-concerned event that occurs in the target third-party application. After obtaining the user-associated event pushed by the third-party server, the HiBoard may display the user-associated event to the user in a form of a card or the like, so that the user learns, in a timely manner, related information of the target third-party application concerned by the user.

Figure 13A:
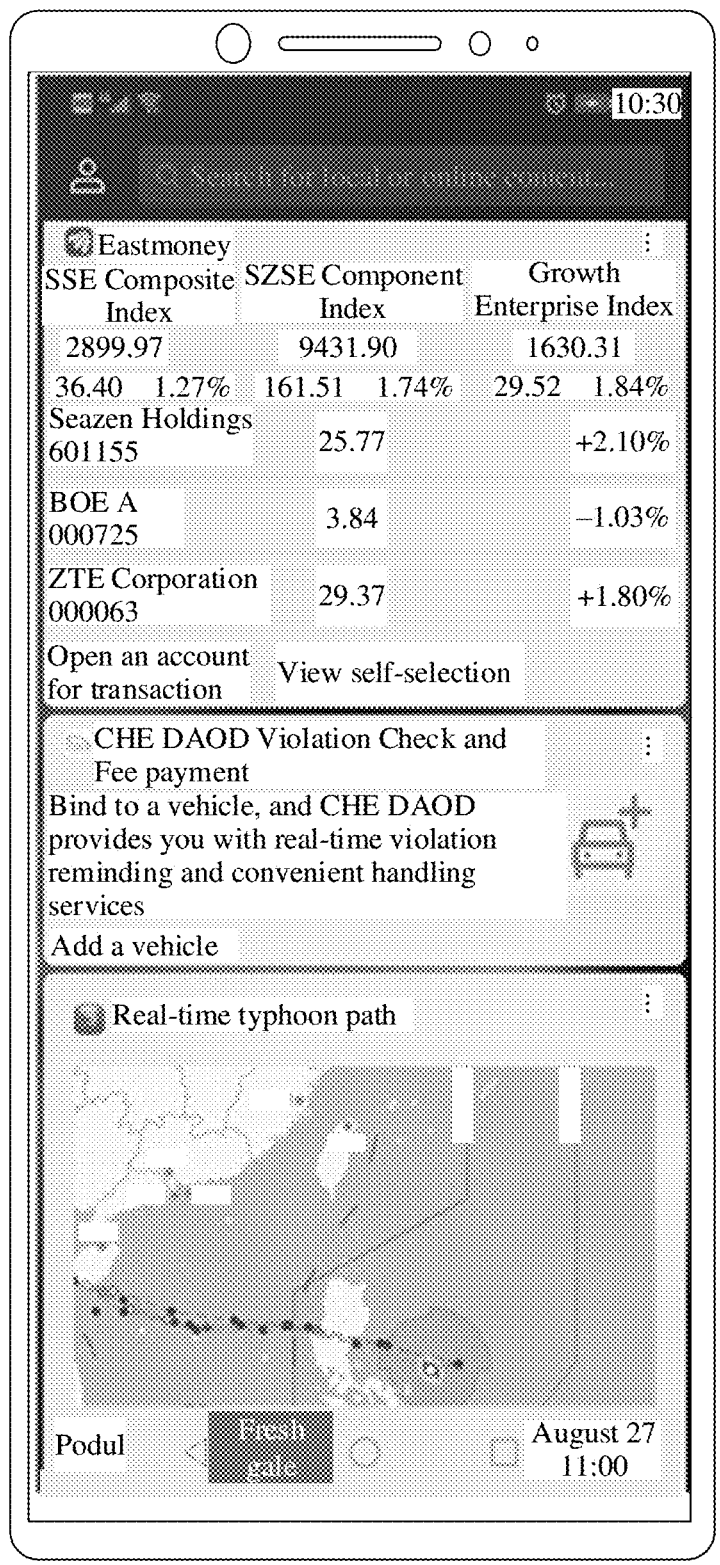
FIG. 13(a) and FIG. 13(b) are example schematic diagrams of another group of interfaces according to an embodiment of this application.
Figure 13B:
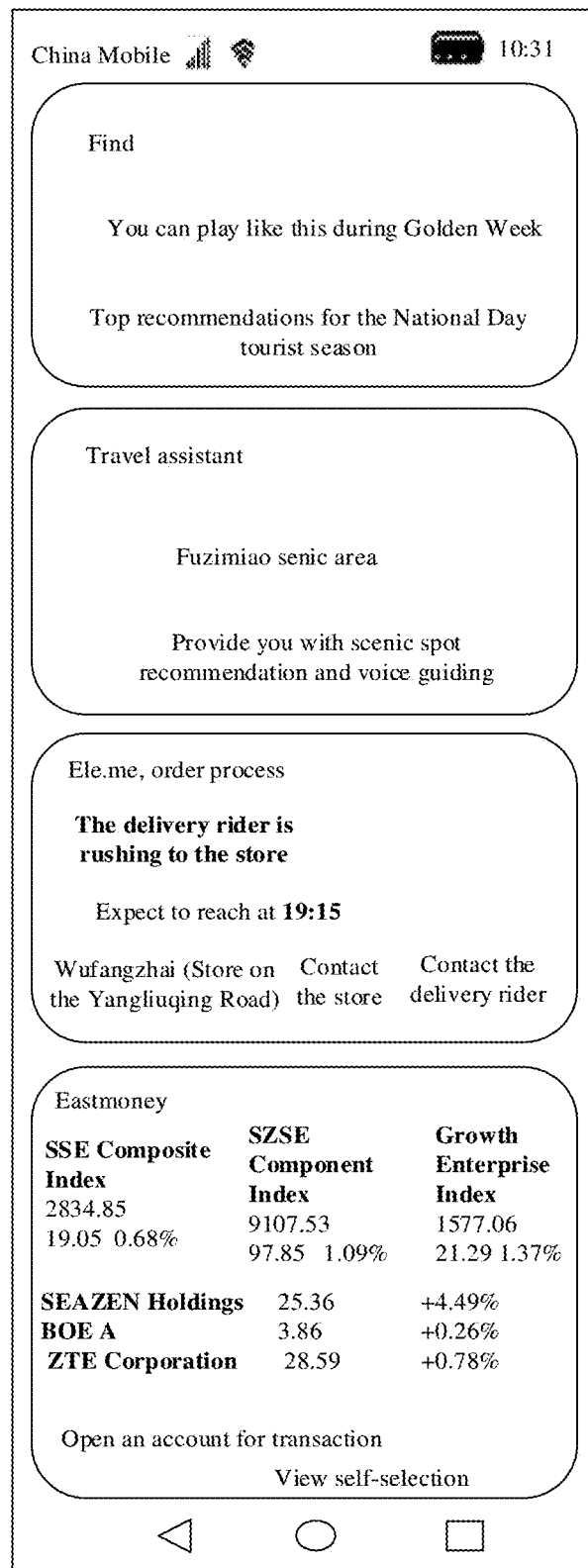

For example, if the target third-party application is a delivery application, the user-associated event may be an event about delivery of an order of the user. If the target third-party application is Ant Forest, the user-associated event is an event that green energy is generated in Ant Forest of the user. If the target third-party application is Eastmoney, the user-associated event is a related event of a stock concerned by the user. For example, if a self-selected stock concerned by the user in the target third-party application Eastmoney includes BOE A, for a home page that is of the HiBoard and that is used to display the user-associated event, refer to FIG. 13(a) or FIG. 13(b).

In addition, in some other embodiments, if the user indicates to subscribe to the target third-party application and perform account binding, but the user does not set a personalized user-associated event in the third-party application, after account binding succeeds, the target third-party application may recommend a common event to the HiBoard corresponding to the OpenID, and display the common event on the home page of the HiBoard. For example, the target third-party application is Eastmoney, and the common event is stock index information.

Figure 14:
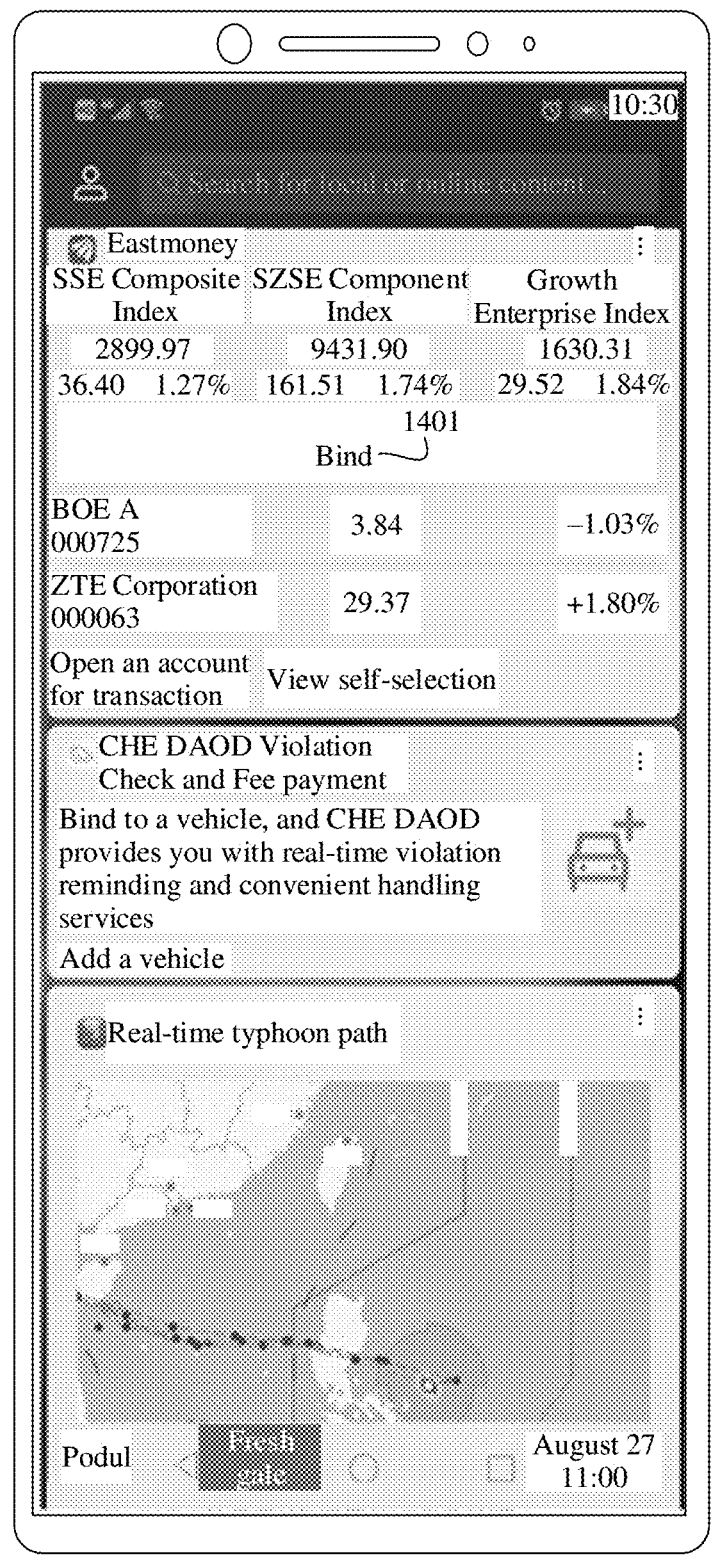
FIG. 14 is an example schematic diagram of another interface according to an embodiment of this application.

In addition, in some other embodiments, if the user indicates to subscribe to the target third-party application but does not indicate to perform account binding, the third-party server may also recommend a common event to the HiBoard, and display the common event on the home page of the HiBoard. In some embodiments, referring to FIG. 14, a card that is of the HiBoard and that is used to display the recommended common event may further include a control 1401 used to perform account binding. After detecting an operation in which the user taps the control 1401, the HiBoard may perform step 507 and a subsequent account binding procedure.

In this embodiment of this application, the login page of the target third-party application may be in a plurality of forms, and step 509 and step 510 may also correspond to different implementations. Description is provided below by using an example.

(1). The login page of the target third-party application is a login card.

When the target third-party application is released on the HiBoard server, the login page of the target third-party application may be preset to be in a card mode during binding, and the login page information is a login card object.

Figure 15:
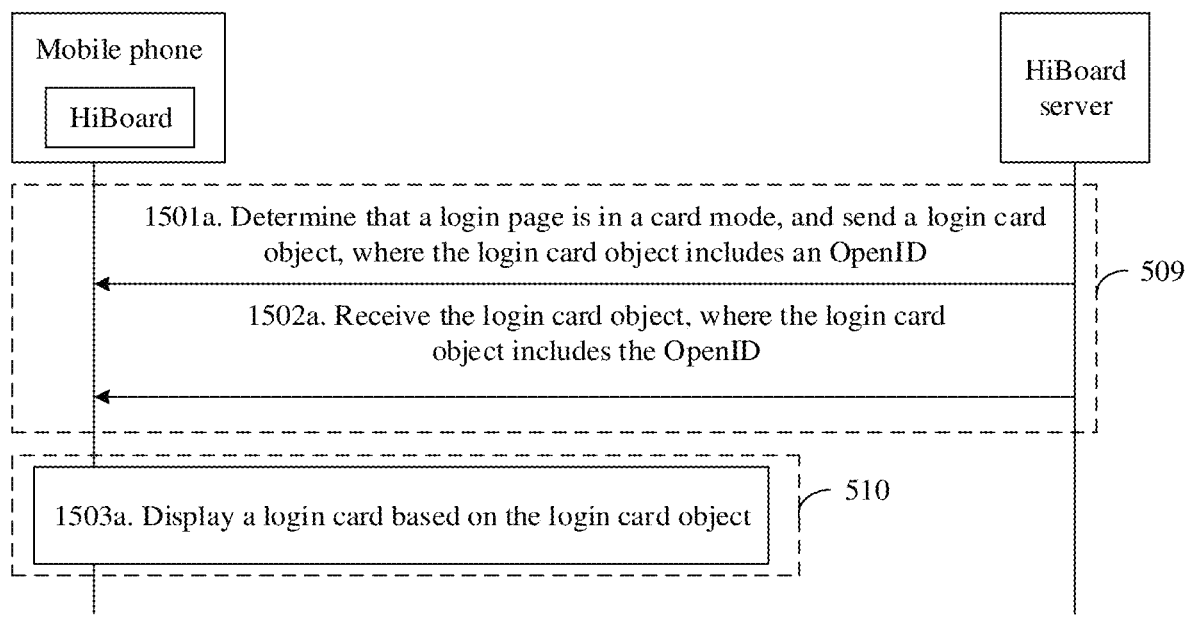
FIG. 15 is an example flowchart of displaying a login page of a third-party application according to an embodiment of this application.

In some embodiments, the login card is preset on the HiBoard server. Referring to FIG. 15, step 509 may include the following steps:

1501a. The HiBoard server determines that the login page is in a card mode, and sends, to the HiBoard, the login card object corresponding to the target third-party application, where a parameter of the login card object includes the OpenID.

The HiBoard server may determine, based on the identity information of the target third-party application, the login card object corresponding to the target third-party application. The login card object includes a parameter, and the parameter is used to describe a feature or function of the login card. The HiBoard server may add the OpenID to the parameter of the login card object, to send the OpenID to the HiBoard together with the login card object. For example, the login card may be described by using JavaScript code, and the login card object may be a download address and a corresponding parameter that are of the JavaScript code of the login card.

1502a. The HiBoard receives the login card object sent by the HiBoard server, where the parameter of the login card object includes the OpenID.

Referring to FIG. 15, step 510 may include the following step:

1503a. The HiBoard displays the login card based on the login card object.

Figure 16A:
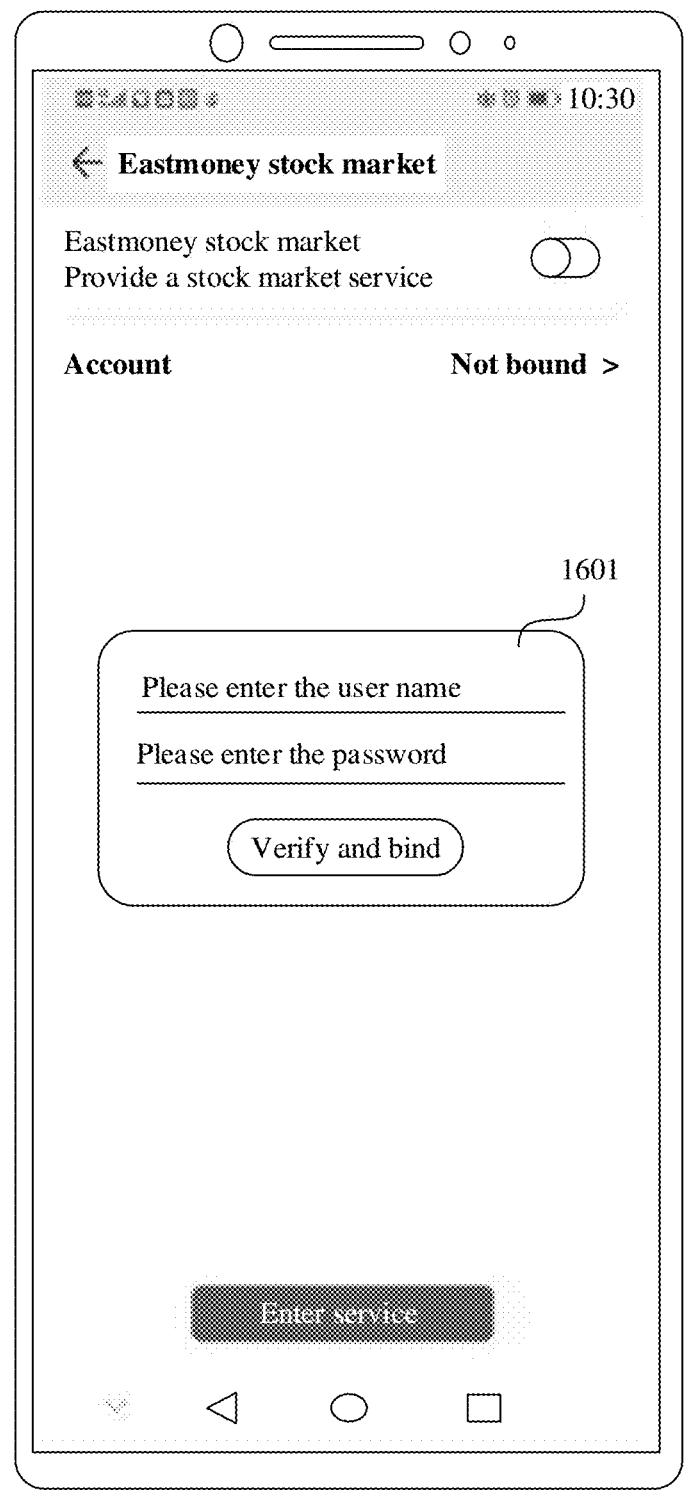
FIG. 16(a) and FIG. 16(b) are example schematic diagrams of another group of interfaces according to an embodiment of this application.
Figure 16B:
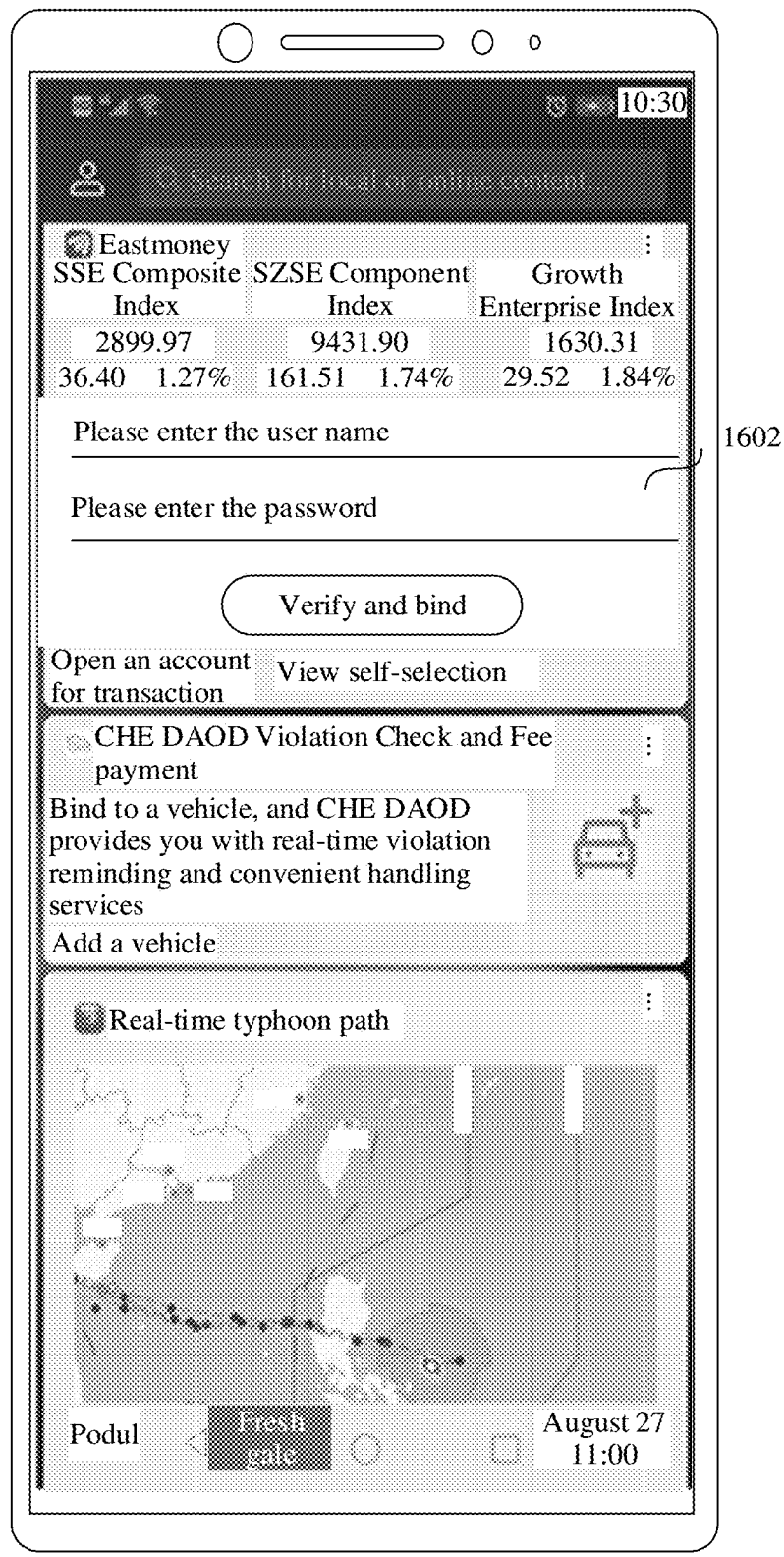

For example, after detecting the preset operation 1 in which the user indicates to perform binding, the HiBoard may display the login card shown in FIG. 16(a) or FIG. 16(b). The login card is not developed based on a third-party quick application.

In some other embodiments, the login card is preset on the third-party server. In step 509, the HiBoard server invokes an interface of the third-party server in real time, and sends the OpenID to the third-party server. The third-party server adds the OpenID to the parameter of the login card, and sends, to the HiBoard server, the login card object to which the OpenID is added. The HiBoard server forwards, to the HiBoard, the login card object to which the OpenID is added.

In some other embodiments, the login card is preset on the third-party server. In step 509, the HiBoard server invokes an interface of the third-party server in real time to obtain a download path of the login card. The HiBoard server adds the OpenID to the download path of the login card, and forwards, to the HiBoard, the download path that is of the login card and to which the OpenID is added. In this case, the HiBoard server may not determine whether the login page of the target third-party application is in a card mode or a page mode, and a mode of the login page of the target third-party application is determined by the third-party server. The HiBoard server may request, from the third-party server, to obtain the login page information of the target third-party application. If the third-party server determines that the login page of the target third-party application is in a card mode, the third-party server adds the OpenID to the download path of the login card, and returns, to the HiBoard server, the download path that is of the login card and to which the OpenID is added. The HiBoard server returns, to the HiBoard, the download path that is of the login card and to which the OpenID is added.

The login card is a static resource. Considering cases such as an unstable network status and a delay, compared with that the login card is preset on the third-party server, when the login card is preset on the HiBoard server, a device manufacturer of the mobile phone may perform processing such as acceleration, so that performance and reliability are higher.

It should be noted that the parameter of the login card object returned by the HiBoard server to the HiBoard in step 1501a includes the OpenID, that is, the login page is bound to the OpenID. In this way, after subsequently displaying the login page based on the login card object and obtaining the account that is of the target third-party application and that is entered by the user, the HiBoard may submit the user account of the target third-party application to the third-party server together with the OpenID, so that the third-party server performs account binding.

In the solution shown in FIG. 15, the HiBoard may obtain the OpenID corresponding to the user account of the HiBoard, and establish a binding relationship between the user account of the target third-party application and the OpenID based on a preset login card of the target third-party application, that is, establish a binding relationship between the user account of the target third-party application and the user account of the HiBoard. The login card is not developed based on a third-party quick application.

Therefore, compared with a conventional technology, the target third-party application does not need to do the following complex development work: developing a third-party quick application to implement account binding, specifically developing a login page that is based on the third-party quick application to implement account binding, and invoking, in the third-party quick application, the account management SDK of the HiBoard to obtain an authorization code corresponding to the user account of the HiBoard to further obtain the OpenID, so as to simplify a development procedure of the target third-party application, reduce development workload of the target third-party application, simplify a procedure for binding the accounts of the target third-party application and the HiBoard, reduce account binding costs of the target third-party application, and improve efficiency and flexibility of account binding.

(2). The login page of the target third-party application is a hypertext markup language 5 H5 login page.

Figure 17:
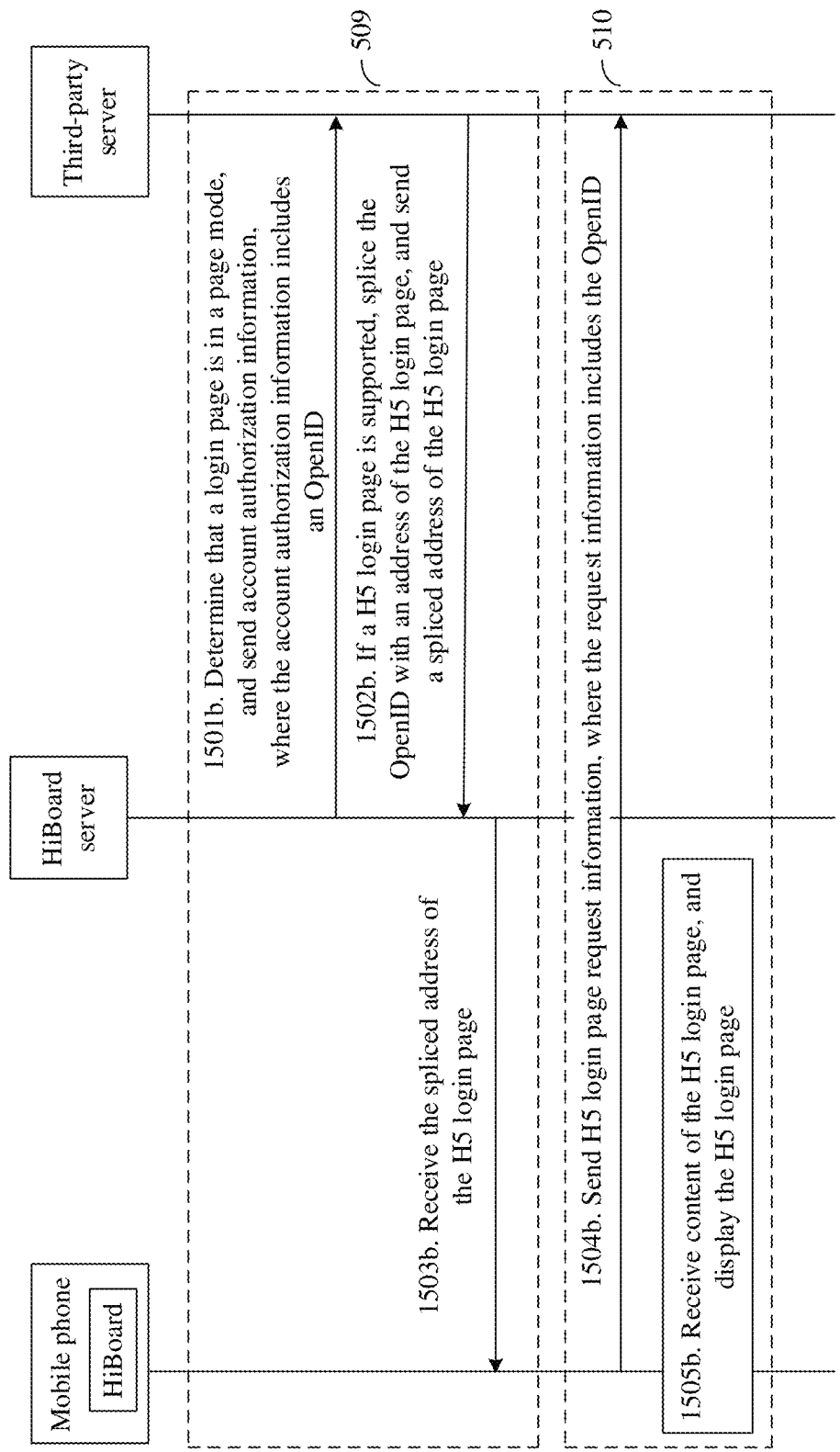
FIG. 17 is another example flowchart of displaying a login page of a third-party application according to an embodiment of this application.

When the target third-party application is released on the HiBoard server, the login page of the target third-party application is preset to be in a page mode during binding, and the login page information is a spliced address of the H5 login page. Referring to FIG. 17, step 509 may include the following steps.

1501b. The HiBoard server determines that the login page is in a page mode, and sends account authorization information to the third-party server, where the account authorization information includes the OpenID.

The HiBoard server may determine the third-party server based on the identity information that is of the target third-party application that is received from the HiBoard, to send the OpenID to the third-party server. The account authorization information sent by the HiBoard server to the third-party server includes the OpenID, and may include the identity information of the target third-party application, or may not include the identity information of the target third-party application.

1502b. If the third-party server determines that the third-party server supports the H5 login page of the target third-party application, the third-party server splices the OpenID with an address of the H5 login page, and returns a spliced address of the H5 login page to the HiBoard server.

The address of the H5 login page may be an address of an existing login page of the target third-party application, for example, may be an HTTP address of the login page. The existing H5 login page may be multiplexed in a binding process, and the target third-party application does not need to specially design a login page for account binding.

A manner of splicing the OpenID with the address of the H5 login page is flexible. For example, the OpenID may be spliced after, before, or in the address of the H5 login page. In other words, the third-party server may splice the OpenID with the address of the H5 login page. Subsequently, the third-party server may provide the H5 login page of the target third-party application based on the spliced address of the H5 login page.

1503b. The HiBoard receives the spliced address that is of the H5 login page and that is sent by the HiBoard server.

Step 510 may include the following steps:

1504b. The HiBoard sends H5 login page request information to the third-party server, where the request information includes the OpenID.

The HiBoard invokes the spliced address of the H5 login page to request, from the third-party server, to obtain the H5 login page of the target third-party application.

1505b. The HiBoard receives content that is of the H5 login page and that is sent by the third-party server, and displays the H5 login page.

The third-party server returns the content of the H5 login page to the HiBoard. The HiBoard uses a web browser to load the H5 login page, and the user can see the H5 login page on the screen. The H5 login page may display, to the user, information such as a user name input box and a password input box that are provided by the target third-party application. For example, for the H5 login page, refer to FIG. 11(a) or FIG. 11(b). The H5 login page is not a page developed based on a third-party quick application.

In the solution shown in FIG. 17, the HiBoard may obtain the OpenID corresponding to the user account of the HiBoard, and multiplex the existing H5 login page of the target third-party application to establish a binding relationship between the user account of the target third-party application and the OpenID, that is, establish a binding relationship between the user account of the target third-party application and the user account of the HiBoard. The H5 login page is an existing page, and is not a page developed based on a third-party quick application.

Therefore, compared with a conventional technology, the target third-party application does not need to do the following complex development work: developing a third-party quick application to implement account binding, specifically developing a login page that is based on the third-party quick application to implement account binding, and invoking, in the third-party quick application, the account management SDK of the HiBoard to obtain an authorization code corresponding to the user account of the HiBoard to further obtain the OpenID, so as to simplify a development procedure of the target third-party application, reduce development workload of the target third-party application, simplify a procedure for binding the accounts of the target third-party application and the HiBoard, reduce account binding costs of the target third-party application, and improve efficiency and flexibility of account binding.

(3). The login page of the target third-party application is a native application login page, that is, a login page of a native target third-party application.

Figure 18:
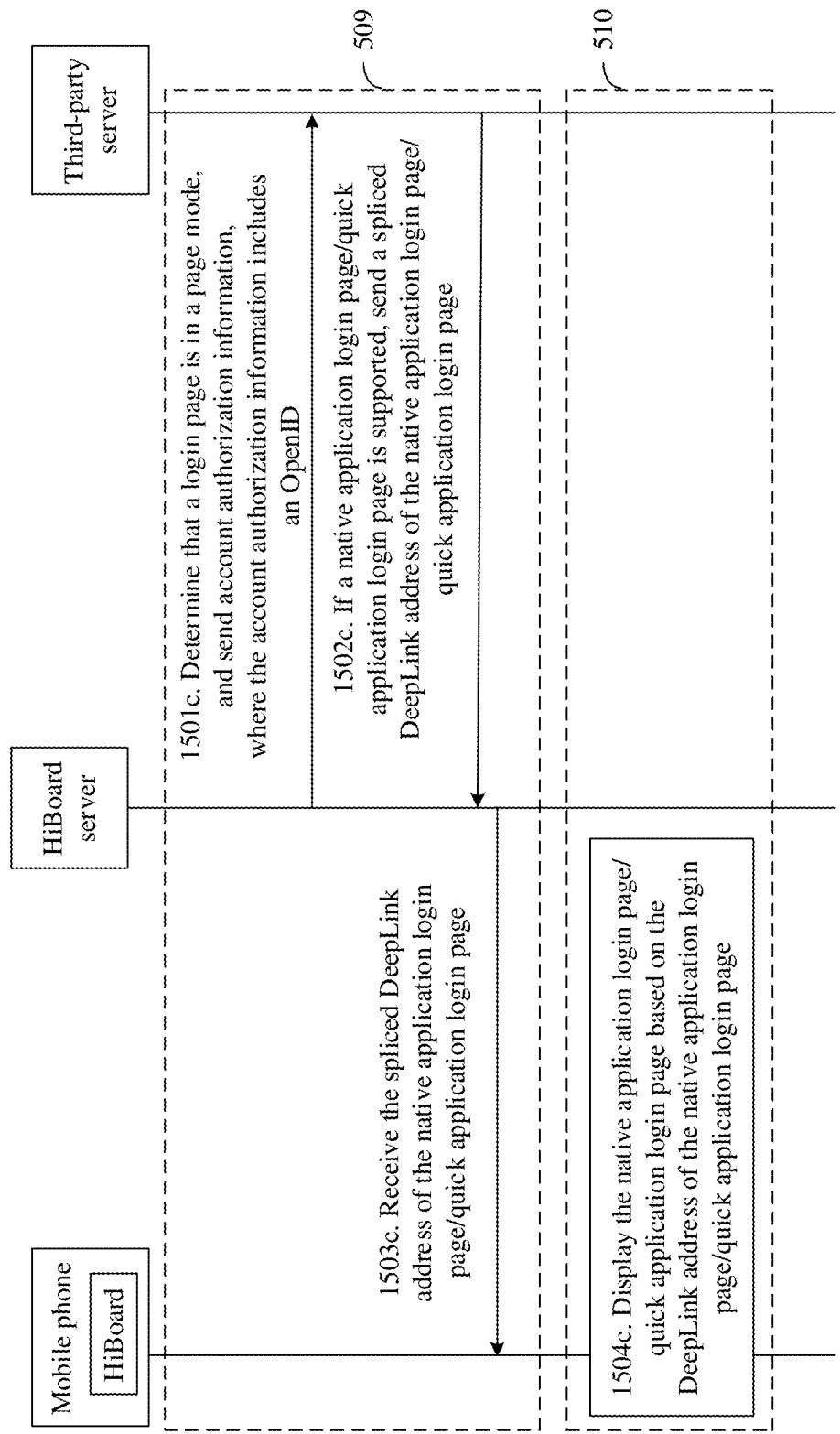
FIG. 18 is another example flowchart of displaying a login page of a third-party application according to an embodiment of this application.

When the target third-party application is released on the HiBoard server, the login page of the target third-party application may be preset to be in a page mode during account binding, and the login page information a spliced address of the native application login page, for example, a spliced deep link DeepLink address of the native application login page. Referring to FIG. 18, step 509 may include the following steps.

1501c. The HiBoard server determines that the login page is in a page mode, and sends account authorization information to the third-party server, where the account authorization information includes the OpenID.

The HiBoard server may determine the third-party server based on the identity information that is of the target third-party application that is received from the HiBoard, to send the OpenID to the third-party server. The account authorization information sent by the HiBoard server to the third-party server includes the OpenID, and may include the identity information of the target third-party application, or may not include the identity information of the target third-party application.

1502c. If the third-party server determines that the third-party server supports the native application login page of the target third-party application, the third-party server splices the OpenID with the DeepLink address of the native application login page, and returns a spliced DeepLink address of the native application login page to the HiBoard server.

In other words, the third-party server may splice the OpenID with the DeepLink address of the native application login page. Subsequently, the third-party server may provide the native application login page of the target third-party application based on the spliced DeepLink address of the native application login page.

1503c. The HiBoard receives the spliced DeepLink address that is of the native application login page and that is sent by the HiBoard server.

Step 510 may include the following step:

1504c. The HiBoard displays the native application login page based on the spliced DeepLink address of the native application login page.

The HiBoard may pull the native application login page based on the spliced DeepLink address of the native application login page. The native application login page herein is the login page of the native target third-party application. For example, for the native application login page, refer to a page shown in FIG. 11(a) or FIG. 11(b). The login page is not a page developed based on a third-party quick application.

In the solution shown in FIG. 18, the HiBoard may obtain the OpenID corresponding to the user account of the HiBoard, and multiplex the existing native application login page of the target third-party application to establish a binding relationship between the user account of the target third-party application and the OpenID, that is, establish a binding relationship between the user account of the target third-party application and the user account of the HiBoard. The native application login page is an existing page, and is not a page developed based on a third-party quick application.

Therefore, compared with a conventional technology, the target third-party application does not need to do the following complex development work: developing a third-party quick application to implement account binding, specifically developing a login page that is based on the third-party quick application to implement account binding, and invoking, in the third-party quick application, the account management SDK of the HiBoard to obtain an authorization code corresponding to the user account of the HiBoard to further obtain the OpenID, so as to simplify a development procedure of the target third-party application, reduce development workload of the target third-party application, simplify a procedure for binding the accounts of the target third-party application and the HiBoard, reduce account binding costs of the target third-party application, and improve efficiency and flexibility of account binding.

(4) The login page of the target third-party application is a quick application login page of the target third-party application.

Referring to FIG. 18, a corresponding processing procedure in this case is similar to that in the foregoing case (3), and a difference lies in that the address of the native application login page is replaced with an address of the quick application login page of the target third-party application. For example, the DeepLink address of the native application login page is replaced with a DeepLink address of the quick application login page. To be specific, the third-party server may splice the OpenID with the DeepLink address of the quick application login page, and return a spliced DeepLink address of the quick application login page to the HiBoard, so that the HiBoard displays the quick application login page. For example, for the quick application login page, refer to a page shown in FIG. 11(a) or FIG. 11(b).

It should be noted that the quick application login page is a login page developed based on a third-party quick application, but an existing login page of the target third-party application is not a login page specially designed for an account binding procedure. Therefore, no additional development procedure and development workload are added to the target third-party application for binding to the HiBoard.

In other words, the HiBoard may obtain the OpenID corresponding to the user account of the HiBoard, and multiplex the existing quick application login page of the target third-party application to establish a binding relationship between the user account of the target third-party application and the OpenID, that is, establish a binding relationship between the user account of the target third-party application and the user account of the HiBoard. The quick application login page is an existing page, and is not a page developed based on a third-party quick application.

Therefore, compared with a conventional technology, the target third-party application does not need to do the following complex development work: developing a third-party quick application to implement account binding, specifically developing a login page that is based on the third-party quick application to implement account binding, and invoking, in the third-party quick application, the account management SDK of the HiBoard to obtain an authorization code corresponding to the user account of the HiBoard to further obtain the OpenID, so as to simplify a development procedure of the target third-party application, reduce development workload of the target third-party application, simplify a procedure for binding the accounts of the target third-party application and the HiBoard, reduce account binding costs of the target third-party application, and improve efficiency and flexibility of account binding.

It should be noted that the spliced address that is of the login page and that is returned by the third-party server to the HiBoard server in step 1502b or step 1502c includes the OpenID, that is, the login page is bound to the OpenID. In this way, after subsequently obtaining, by displaying the login page, the account that is of the target third-party application and that is entered by the user, the HiBoard may submit the user account of the target third-party application to the third-party server together with the OpenID, so that the third-party server performs account binding.

Figure 19A:
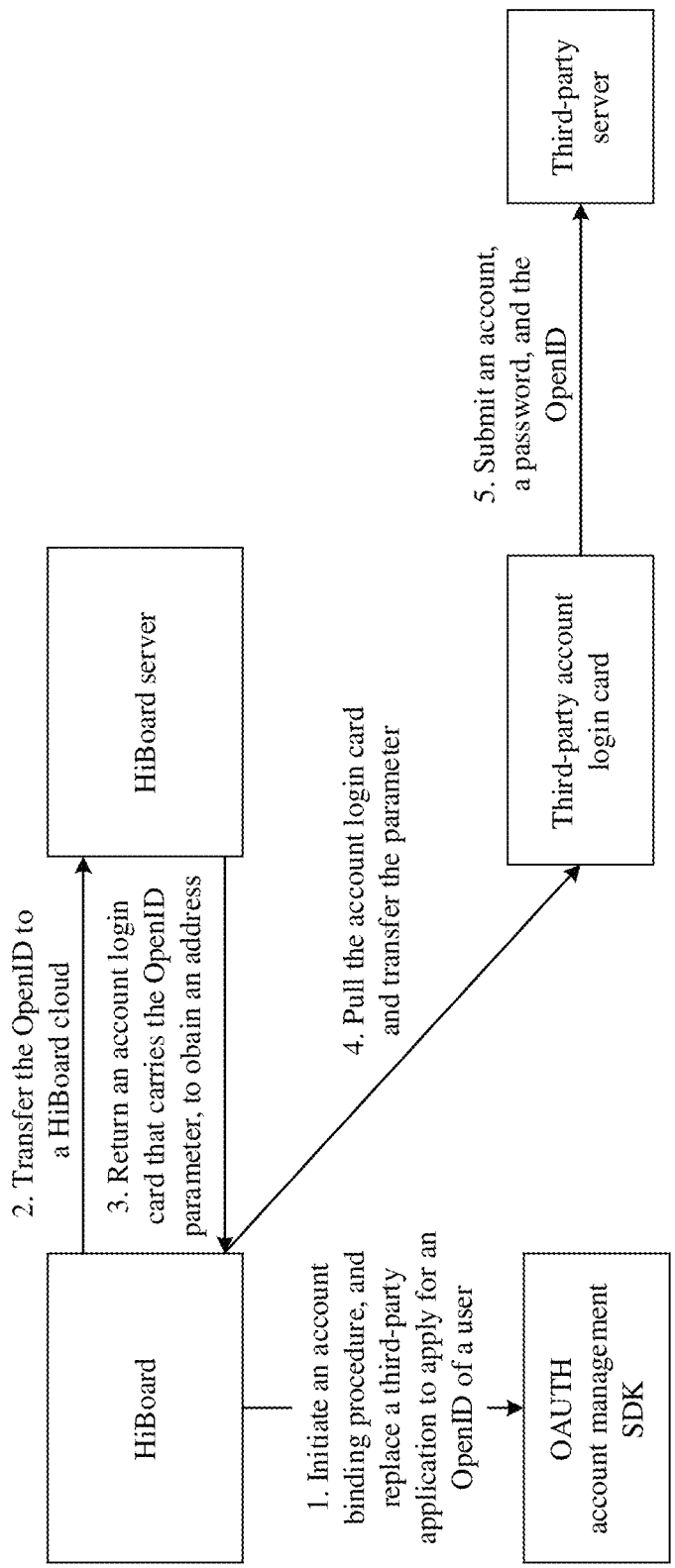
FIG. 19(a) and FIG. 19(b) are example schematic diagrams of a group of account binding processes according to an embodiment of this application.
Figure 19B:
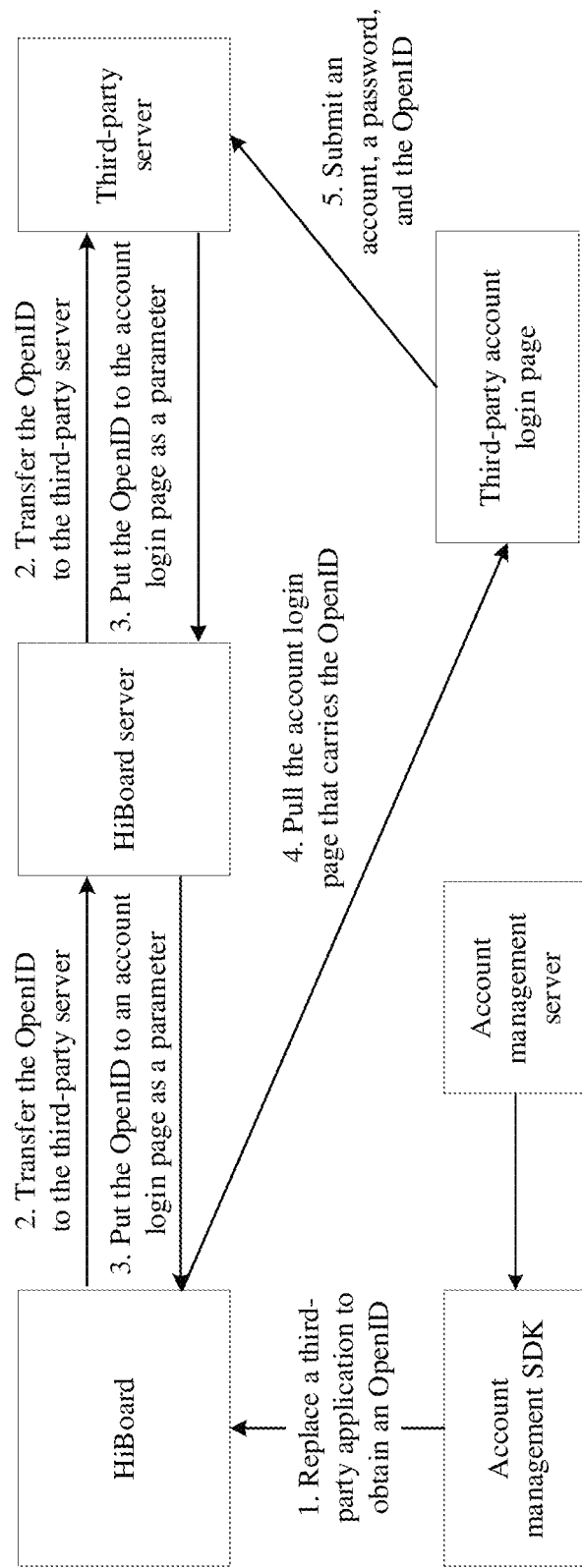

If the HiBoard server determines that the login page is in a card mode, for a procedure of the account binding method provided in the embodiments of this application, refer to FIG. 19(a). If the HiBoard server determines that the login page is in a page mode, for a procedure of the account binding method provided in the embodiments of this application, refer to FIG. 19(b).

The procedure shown in FIG. 17 or FIG. 18 is described by using an example in which the HiBoard server determines that the login page is in a page mode. In some other embodiments, in step 1501b or step 1501c, the HiBoard server may not determine whether the login page of the target third-party application is in a card mode or a page mode, and the HiBoard server may send the account authorization information to the third-party server. A mode of the login page of the target third-party application is determined by the third-party server. In step 1502b or step 1502c, if the third-party server determines that the login page of the target third-party application is in a page mode, the third-party server splices the OpenID with an address corresponding to a supported page type. The supported page type includes the H5 login page, the native application login page, the quick application login page, or the like.

If the third-party server determines that a plurality of page types are supported, the third-party server may return, to the HiBoard server, an address corresponding to one or more of the page types. For example, different page types have different priorities, and the third-party server may return, to the HiBoard server, an address corresponding to a page type with a highest priority. For another example, the third-party server may randomly select an address corresponding to a page type, and return the address to the HiBoard server.

It should be noted that in some other embodiments, the account binding method may include some steps in the foregoing procedure. In some other embodiments, the account binding method may further include a step other than the steps shown in the foregoing procedure.

Figure 20:
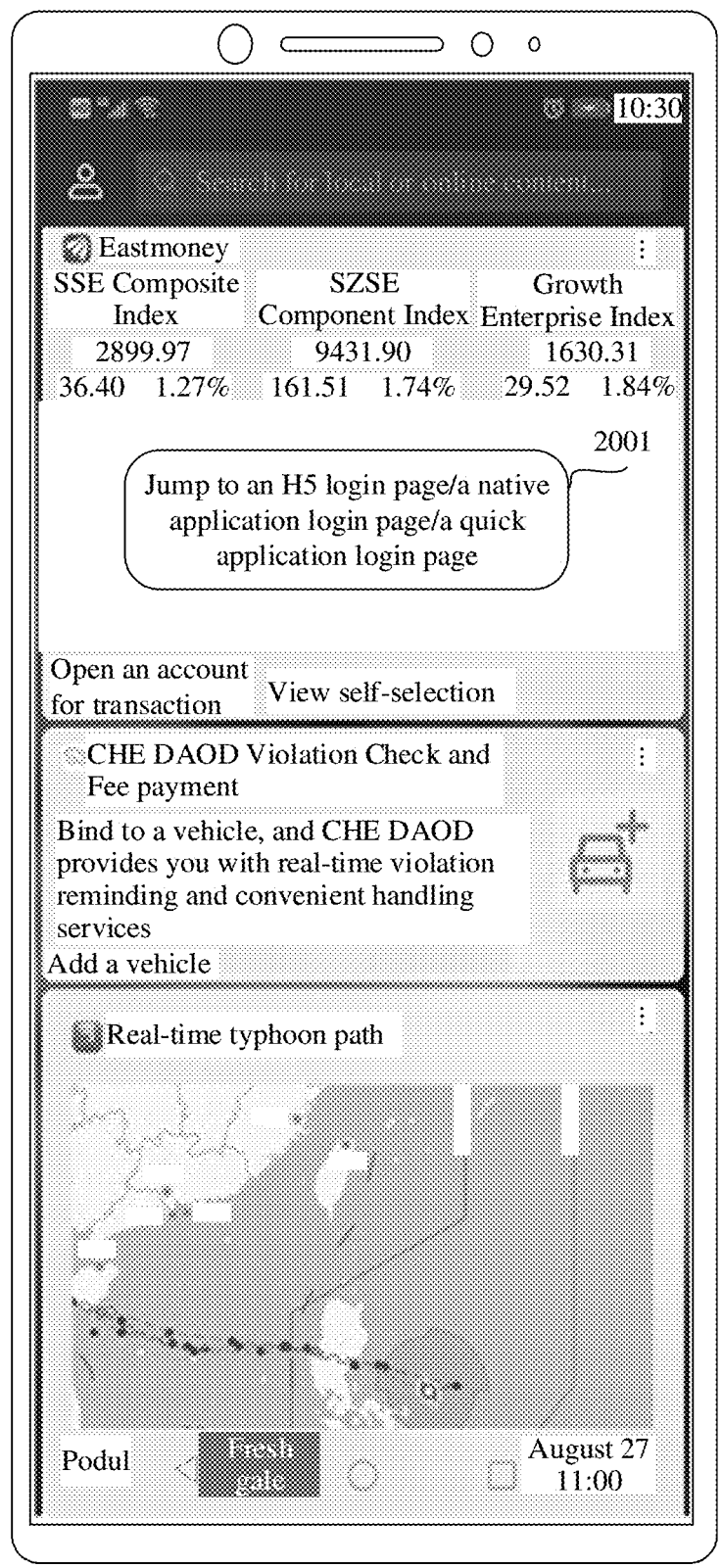
FIG. 20 is an example schematic diagram of another interface according to an embodiment of this application.

In some other embodiments, the login card may also include a jump control, which is used to jump to the H5 login page, the native application login page, or the quick application login page to log in to an account. For example, the jump button may be a control 2001 shown in FIG. 20.

In some embodiments, the account management server, the HiBoard server, or the third-party server may be a cloud server or another server.

In some other embodiments, when the login page of the target third-party application is in a page mode during account binding, splicing the OpenID with the address of the H5 login page, the DeepLink address of the native application login page, or the DeepLink address of the quick application login page may not be performed on the third-party server, but performed on the HiBoard server; or a spliced address may be preset on the HiBoard server. An address splicing manner is relatively flexible, and address splicing manners of different target third-party applications may be different. In addition, to ensure security, the third-party server may carry some time-varying parameters in the address, to avoid a replay attack on the login page, and a splicing manner is relatively complex. Therefore, the third-party server performs address splicing in a simpler manner, and this is more easily adapted to processing manners of different target third-party applications.

In some other embodiments, that the HiBoard replaces the target third-party application to obtain the OpenID may be replaced with the following: The HiBoard server replaces the target third-party application to obtain the OpenID. Compared with that the HiBoard server replaces the target third-party application to obtain the OpenID, when the HiBoard replaces the target third-party application to obtain the OpenID, the HiBoard may interact with the user, and obtain the OpenID after the user authorizes binding, which does not easily cause user privacy violation.

It can be understood that the home page of the HiBoard is currently usually a leftmost screen of a home screen. In some other embodiments, the HiBoard may be a rightmost screen of the home screen or a page at another location. This is not limited in the embodiments of this application.

The foregoing is mainly described by using an example in which the first application is the HiBoard that shares a same user account with the mobile phone. In some other embodiments, the first application may be another application such as a system application (for example, a status bar) that shares a same user account with the mobile phone. Examples are not enumerated one by one in the embodiments of this application.

In some other embodiments, the first application may be an application that does not share a same user account with the mobile phone. For example, the first application may be a platform-type application, such as WeChat or Alipay, that can display an event recommended by the target third-party application. For example, WeChat may display a user-associated event recommended by another application. In this case, the OpenID corresponding to the first application is no longer an OpenID allocated by an account management server of the mobile phone, but an OpenID allocated by an account management server corresponding to the first application such as WeChat or Alipay.

In particular, the target third-party application may be an application with specific qualification (such as a stock or medical care). The solution provided in the embodiments of this application may be applied to the following scenario: Due to a limitation of a factor such as qualification, an event card displayed by the HiBoard cannot be developed by a mobile phone system, and needs to be developed by the target third-party application, and therefore the account of the target third-party application needs to be bound to that of the HiBoard.

In some other embodiments, without performing the foregoing account binding procedure, the first application may further display a user-associated event recommended by another application that shares a user account with the first application. For example, the HiBoard shares a Huawei account with a Huawei video. Without the foregoing binding procedure, the HiBoard can display a user-associated event recommended by the Huawei video.

In some other embodiments, the first application may further display a user-associated event recommended by another application (such as news) whose account does not need to be bound to that of the first application.

The foregoing is described by using an example in which the electronic device is a mobile phone. The account binding method provided in the embodiments of this application may be further applied to another electronic device such as a tablet or in-vehicle central control.

It may be understood that, to implement the foregoing functions, the electronic device includes a corresponding hardware and/or software module for performing each function. With reference to algorithm steps of each example described in the embodiments disclosed in this specification, this application can be implemented in a form of hardware or a combination of hardware and computer software. Whether a function is performed by hardware or hardware driven by computer software depends on a particular application and a design constraint of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that division into the modules in the embodiments is an example, and is merely logical function division. In an actual implementation, another division manner may be used.

Figure 21:
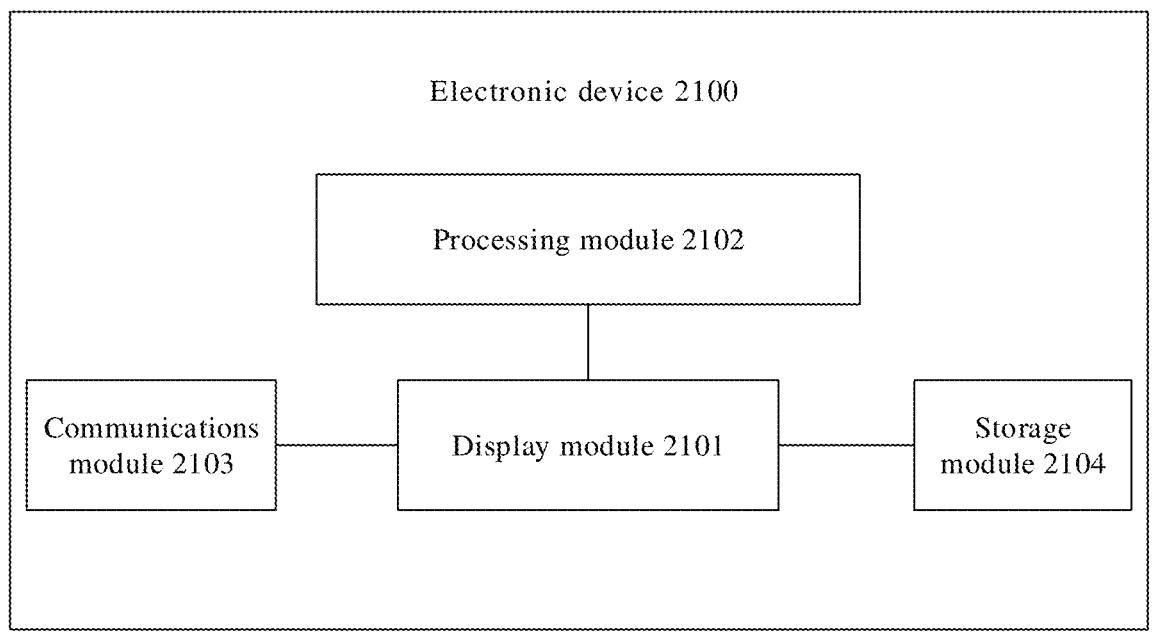
FIG. 21 is an example schematic diagram of another structure according to an embodiment of this application.

For example, in a division manner, referring to FIG. 21, an electronic device 2100 may include a display module 2101, a processing module 2102, a communications module 2103, and a storage module 2104.

The display module 2101 may be configured to support the electronic device 2100 in displaying a user interface. For example, the display module 2101 may be configured to support the electronic device 2100 in performing step 501, step 504, step 505, step 510, step 514, step 517, step 519, and the like in the procedure shown in FIG. 5, and/or performing another process of the technology described herein.

The processing module 2102 may be configured to control and manage an action of the electronic device 2100. For example, the processing module 2102 may be configured to support the electronic device 2100 in performing step 502, step 503, step 505, step 506, step 511, step 512, and the like in the procedure shown in FIG. 5, and/or performing another process of the technology described herein.

The communications module 2103 may be configured to support the electronic device 2100 in communicating with another device. For example, the communications module 2103 may be configured to support the electronic device 2100 in performing step 507, step 508, step 509, step 512, step 516, or the like in the procedure shown in FIG. 5, and/or performing another process of the technology described herein.

The storage module 2104 may be configured to store instructions and data, for example, store code of a first application, store an OpenID obtained by the electronic device 2100 by using the communications module, and store information such as a user account entered by a user.

The display module 2101 may be a display, for example, may be specifically the display 194 in the hardware structure shown in FIG. 4. The processing module 2102 may be a processor or a controller. The processing module may implement or execute various example logical blocks, modules, and circuits described with reference to content disclosed in this application. Alternatively, the processor may be a combination for implementing a computing function, for example, a combination of one or more microprocessors, or a combination of a digital signal processor (DSP) and a microprocessor. For example, the processing module 2102 may be specifically the processor 110 in the hardware structure shown in FIG. 4. The communications module 2103 may be a device, such as a radio frequency circuit, a Bluetooth chip, or a Wi-Fi chip, that interacts with another electronic device. For example, the communications module 2103 may include the mobile communications module 150, the wireless communications module 160, the antenna 1, the antenna 2, or the like in the hardware structure shown in FIG. 4. The storage module 2104 may be a memory, for example, may be specifically the internal memory 121 in the hardware structure shown in FIG. 4.

It should be noted that all related content of the steps in the foregoing method embodiments may be cited in function description of corresponding function modules.

An embodiment of this application further provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the account binding method in the foregoing embodiments.

An embodiment of this application further provides a computer storage medium. The computer storage medium stores computer instructions. When the computer instructions are run on an electronic device, the electronic device is enabled to perform the foregoing related method steps, to implement the account binding method in the foregoing embodiments.

An embodiment of this application further provides a computer program product. When the computer program product is run on a computer, the computer is enabled to perform the foregoing related steps, to implement the account binding method performed by the electronic device in the foregoing embodiment.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the account binding method performed by the electronic device in the foregoing method embodiments.

An embodiment of this application further provides a chip system. The chip system is applied to an electronic device, and the chip system includes one or more interface circuits and one or more processors. The interface circuit and the processor are interconnected by using a line. The interface circuit is configured to receive a signal from the memory of the electronic device, and send a signal to the processor. The signal includes computer instructions stored in the memory. When the processor executes the computer instructions, the electronic device is enabled to perform the account binding method provided in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above.

Another embodiment of this application provides a system. For a schematic diagram of an architecture of the system, refer to FIG. 2. Devices in the system may be configured to implement the account binding method in the foregoing method embodiments.

Based on the foregoing descriptions of the implementations, a person skilled in the art may understand that for the purpose of convenient and brief description, division into the foregoing function modules is merely used as an example for description. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division in an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An account binding method, comprising:
   logging in, by an electronic device, to a user account of a first application;
   detecting, by the electronic device, a first operation of a user, wherein the first operation is used for associating a second application with the first application;
   obtaining, by the electronic device, a unique open identity (OpenID) corresponding to the user account of the first application;
   sending, by the electronic device, the OpenID and identity information of the second application to a server associated with the first application; and
   obtaining, by the electronic device, account binding success information from the server associated with the first application, wherein the account binding success information indicates that the user account of the first application is bound to a user account of the second application, wherein after sending the OpenID to the server associate with the first application, the method further comprises:
   obtaining by the electronic device, login page information of the second application from the server associated with the first application, wherein the login page information includes the OpenID;

displaying, by the electronic device, a login page of the second application based on the login page information;

obtaining, by the electronic device, the user account associated with the second application and entered by the user on the login page; and sending, by the electronic device, the user account associated with the second application and the OpenID to the server associated with the second application.

2. The method according to claim 1, wherein the account binding success information is generated by the server associated with the first application after a server associated with the second application binds the OpenID to the user account of the second application and notifies the server associated with the first application.

3. The method according to claim 1, wherein the login page information includes a login card object corresponding to the second application, and a parameter of the login card object includes the OpenID; and displaying, by the electronic device, the login page of the second application based on the login page information comprises:

displaying, by the electronic device, a login card of the second application based on the login card object.

4. The method according to claim 1, wherein the login page information includes an address of a hypertext markup language 5 (H5) login page of the second application, and the address of the H5 login page includes the OpenID; and displaying, by the electronic device, the login page of the second application based on the login page information comprises:

displaying, by the electronic device, the H5 login page of the second application based on the address of the H5 login page.

5. The method according to claim 1, wherein the login page information includes an address of a native application login page of the second application, and the address of the native application login page comprises the OpenID; and displaying, by the electronic device, the login page of the second application based on the login page information comprises:

displaying, by the electronic device, the native application login page of the second application based on the address of the native application login page.

6. The method according to claim 1, wherein the login page information includes an address of a quick application login page of the second application, and the address of the quick application login page includes the OpenID; and displaying, by the electronic device, the login page of the second application based on the login page information comprises:

displaying, by the electronic device, the quick application login page of the second application based on the address of the quick application login page.

7. The method according to claim 1, wherein sending, by the electronic device, the user account associated with the second application and the OpenID to the server associated with the second application comprises:

after detecting a second operation of the user, sending, by the electronic device, the user account associated with the second application and the OpenID to the server associated with the second application, wherein the second operation indicates binding of the user account of the first application to the user account of the second application.

8. The method according to claim 1, wherein obtaining, by the electronic device, the OpenID:

obtaining, by the electronic device, the identity information of the second application;

sending, by the electronic device, the identity information of the second application to an account management server associated with the first application; and obtaining, by the electronic device, the OpenID from the account management server associated with the first application.

9. The method according to claim 1, wherein after obtaining, by the electronic device, the account binding success information from the server associated with the first application, the method further comprises:

obtaining, by the electronic device, a user-associated event pushed by the server associated with the second application; and notifying, by the electronic device, the user of the user-associated event by using the first application.

10. The method according to claim 1, wherein the first application includes a HiBoard.

11. The method according to claim 10, wherein a homepage of the HiBoard includes a leftmost screen of a home screen of a user interface.

12. The method according to claim 10, wherein a homepage of the HiBoard includes a widget interface on a home screen of a user interface.

13. An electronic device, comprising:

a processor; and a memory configured to store computer readable instructions that, when executed by the processor, cause the electronic device to:

log in to a user account of a first application;

detect a first operation of a user, wherein the first operation is used for associating a second application with the first application;

obtain a unique open identity (OpenID) corresponding to the user account of the first application;

send the OpenID and identity information of the second application to a server associated with the first application; and obtain account binding success information from the server associated with the first application, wherein the account binding success information indicates that the user account of the first application is bound to a user account of the second application, wherein the electronic device is further caused to:

obtain login page information of the second application from the server associated with the first application, wherein the login page information includes the OpenID;

display a login page of the second application based on the login page information;

obtain the user account associated with the second application and entered by the user on the login page; and send the user account associated with the second application and the OpenID to the server associated with the second application.

14. The electronic device according to claim 13, wherein the account binding success information is generated by the server associated with the first application after a server associated with the second application binds the OpenID to the user account of the second application and notifies the server associated with the first application.

15. The electronic device according to claim 13, wherein the login page information includes a login card object corresponding to the second application, and a parameter of the login card object includes the OpenID; and displaying the login page of the second application based on the login page information comprises:
    displaying a login card of the second application based on the login card object.

16. The electronic device according to claim 13, wherein the login page information includes an address of a hypertext markup language 5 (H5) login page of the second application, and the address of the H5 login page includes the OpenID; and
    displaying the login page of the second application based on the login page information comprises:
        displaying the H5 login page of the second application based on the address of the H5 login page.

17. The electronic device according to claim 13, wherein the login page information includes an address of a native application login page of the second application, and the address of the native application login page includes the OpenID; and
    displaying the login page of the second application based on the login page information comprises:
        displaying the native application login page of the second application based on the address of the native application login page.

18. The electronic device according to claim 13, wherein the login page information includes an address of a quick application login page of the second application, and the address of the quick application login page includes the OpenID; and
    displaying the login page of the second application based on the login page information comprises:
        displaying the quick application login page of the second application based on the address of the quick application login page.

19. The electronic device according to claim 13, wherein sending the user account associated with the second application and the OpenID to the server associated with the second application comprises:
    after detecting a second operation of the user, sending the user account associated with the second application and the OpenID to the server associated with the second application, wherein the second operation indicates binding of the user account of the first application to the user account of the second application.

20. A non-transitory computer readable storage medium having computer instructions stored therein wherein, when the computer instructions are run on an electronic device, the electronic device is caused to provide execution comprising:
    logging in to a user account of a first application;
    detecting a first operation of a user, wherein the first operation is used for associating a second application with the first application;
    obtaining a unique open identity (OpenID) corresponding to the user account of the first application;
    sending the OpenID and identity information of the second application to a server associated with the first application; and
    obtaining account binding success information from the server associated with the first application, wherein the account binding success information indicates that the user account of the first application is bound to a user account of the second application, wherein the electronic device is further caused to provide execution comprising:
        obtaining login page information of the second application from the server associated with the first application, wherein the login page information includes the OpenID;
        displaying a login page of the second application based on the login page information;
        obtaining the user account associated with the application and entered by the user on the login page; and
        sending the user account associated with the second application and the OpenID to the server associated with the second application.

\* \* \* \* \*